US012636594B2

(12) United States Patent
Cabaleiro et al.

(10) Patent No.: US 12,636,594 B2
(45) Date of Patent: May 26, 2026

(54) CONTINUOUS PURIFICATION DEVICE

(71) Applicant: Stamm Vegh Corporation, San Francisco, CA (US)

(72) Inventors: Juan Martín Cabaleiro, Buenos Aires (AR); Javier Nicolás Amado, Capital Federal (AR); Agustina María Beraldi, Caba (AR); Juan Francisco Llamazares Vegh, Buenos Aires (AR); Victoria Soledad Scordo Paes De Lima, Capital Federal (AR); Omar Miguel Portilla Zuñiga, Buenos Aires (AR); Pablo Rodriguez, Capital Federal (AR)

(73) Assignee: Stamm Vegh Corporation, San Francisco, CA (US)

( * ) Notice: Subject to any disclaimer, the term of this patent is extended or adjusted under 35 U.S.C. 154(b) by 0 days.

(21) Appl. No.: 18/924,424

(22) Filed: Oct. 23, 2024

(65) Prior Publication Data

US 2025/0041762 A1    Feb. 6, 2025

Related U.S. Application Data

(63) Continuation of application No. PCT/US2024/029965, filed on May 17, 2024.

(60) Provisional application No. 63/503,384, filed on May 19, 2023.

(51) Int. Cl.
*B33Y 80/00*    (2015.01)
*B01D 15/38*    (2006.01)

(52) U.S. Cl.
CPC ..... *B01D 15/3885* (2013.01); *B01D 15/3809* (2013.01); *B01D 2221/10* (2013.01); *B01D 2259/814* (2013.01); *B33Y 80/00* (2014.12)

(58) Field of Classification Search
None
See application file for complete search history.

(56) References Cited

U.S. PATENT DOCUMENTS

| | | | |
|---|---|---|---|
| 9,157,550 B2 | 10/2015 | Wheeler et al. | |
| 10,800,104 B2 | 10/2020 | Yun | |
| 11,718,020 B2 | 8/2023 | Llamazares Vegh et al. | |
| 12,331,274 B2 | 6/2025 | Llamazares | |
| 2002/0173033 A1 | 11/2002 | Hammerick et al. | |
| 2005/0032208 A1 | 2/2005 | Oh et al. | |
| 2005/0175302 A1 | 8/2005 | Ishikawa et al. | |
| 2006/0020392 A1 | 1/2006 | Brokaw et al. | |
| 2006/0091051 A1 | 5/2006 | Takada et al. | |

(Continued)

FOREIGN PATENT DOCUMENTS

| | | |
|---|---|---|
| CN | 1678731 A | 10/2005 |
| CN | 1688686 A | 10/2005 |

(Continued)

OTHER PUBLICATIONS

EP20190871830.6 Extended European Search Report dated Jun. 9, 2022.

(Continued)

*Primary Examiner* — Kara M Peo
(74) *Attorney, Agent, or Firm* — Wilson Sonsini Goodrich & Rosati

(57) ABSTRACT

Provided herein are apparatuses, systems, and methods for purification of biological products. The purification apparatus can comprise a mixing module, a wash module, a separation module, an elution module, and an additional separation module.

14 Claims, 21 Drawing Sheets

(56) References Cited

U.S. PATENT DOCUMENTS

| | | |
|---|---|---|
| 2006/0240548 A1 | 10/2006 | Deutsch et al. |
| 2008/0032380 A1 | 2/2008 | Kleis et al. |
| 2008/0305540 A1 | 12/2008 | Hickey et al. |
| 2008/0306000 A1 | 12/2008 | Zhang et al. |
| 2009/0029434 A1 | 1/2009 | Tsai et al. |
| 2010/0116747 A1 | 5/2010 | Franzreb et al. |
| 2010/0248361 A1 | 9/2010 | Lasky et al. |
| 2010/0321478 A1 | 12/2010 | Sliwa et al. |
| 2011/0313560 A1 | 12/2011 | Hangaard et al. |
| 2014/0116881 A1 | 5/2014 | Chapman et al. |
| 2014/0227769 A1 | 8/2014 | Strobbe |
| 2015/0292988 A1 | 10/2015 | Bharadwaj et al. |
| 2015/0343396 A1 | 12/2015 | Aamer et al. |
| 2016/0279707 A1 | 9/2016 | Mattes et al. |
| 2016/0312165 A1 | 10/2016 | Lowe, Jr. et al. |
| 2017/0029968 A1 | 2/2017 | Wadley et al. |
| 2017/0051243 A1 | 2/2017 | Niazi |
| 2017/0192717 A1 | 7/2017 | Lee |
| 2018/0154443 A1 | 6/2018 | Milshtein et al. |
| 2018/0187139 A1 | 7/2018 | Patel |
| 2018/0292053 A1 | 10/2018 | Minor et al. |
| 2018/0369785 A1 | 12/2018 | Fee et al. |
| 2018/0374262 A1 | 12/2018 | Ezair et al. |
| 2019/0138670 A1 | 5/2019 | Bandara et al. |
| 2019/0161835 A1 | 5/2019 | Martin et al. |
| 2019/0227526 A1 | 7/2019 | Taber et al. |
| 2019/0309250 A1 | 10/2019 | Ling |
| 2019/0339261 A1 | 11/2019 | Lind et al. |
| 2019/0366644 A1 | 12/2019 | Blaier et al. |
| 2020/0010788 A1 | 1/2020 | Vellinger et al. |
| 2020/0023584 A1 | 1/2020 | Portela et al. |
| 2020/0248114 A1 | 8/2020 | Melchiorri et al. |
| 2021/0179993 A1 | 6/2021 | Ginn et al. |
| 2021/0348096 A1 | 11/2021 | Llamazares |
| 2021/0381992 A1 | 12/2021 | Aguiar |
| 2022/0143610 A1 | 5/2022 | Biz et al. |
| 2023/0116685 A1 | 4/2023 | Llamazares et al. |
| 2024/0180198 A1 | 6/2024 | Llamazares Vegh et al. |
| 2025/0250523 A1 | 8/2025 | Llamazares Vegh |

FOREIGN PATENT DOCUMENTS

| | | |
|---|---|---|
| CN | 102112594 A | 6/2011 |
| CN | 103562124 A | 2/2014 |
| CN | 104786508 A | 7/2015 |
| CN | 105259664 A | 1/2016 |
| CN | 106228969 A | 12/2016 |
| CN | 106552560 A | 4/2017 |
| CN | 107532132 A | 1/2018 |
| CN | 109260525 A | 1/2019 |
| EP | 1498475 A1 | 1/2005 |
| JP | 2006189426 A | 7/2006 |
| JP | 2019155279 A | 9/2019 |
| KR | 20160033128 A | 3/2016 |
| RU | 2340662 C2 | 12/2008 |
| WO | WO-9505944 A1 | 3/1995 |
| WO | WO-2004020590 A2 | 3/2004 |
| WO | WO-2016157027 A1 | 10/2016 |
| WO | WO-2016172350 A1 | 10/2016 |
| WO | WO-2017103863 A1 | 6/2017 |
| WO | WO-2017161210 A1 | 9/2017 |
| WO | WO-2017192717 A1 | 11/2017 |
| WO | WO-2019050842 A1 | 3/2019 |
| WO | WO-2019206207 A1 | 10/2019 |
| WO | WO-2020076852 A1 | 4/2020 |
| WO | WO-2021102018 A1 | 5/2021 |
| WO | WO-2021158529 A1 | 8/2021 |
| WO | WO-2022229381 A1 | 11/2022 |
| WO | WO-2024059658 A2 | 3/2024 |
| WO | WO-2024243043 A2 | 11/2024 |
| WO | WO-2025106643 A1 | 5/2025 |
| WO | WO-2025250968 A1 | 12/2025 |

OTHER PUBLICATIONS

EP20210750757.3 Extended European Search Report dated Jan. 24, 2024.

Pasko, Alexander et al. Procedural Function-based Modelling of Volumetric Microstructures. Graphical Models 73(5):165-181 (2011).

Pasko, Alexander et al. Procedural Function-Based Spatial Micro-structures. Shape Modeling International Conference: 47-56 (2010).

PCT/US2019/055231 International Search Report and Written Opinion dated Feb. 11, 2020.

PCT/US2021/016187 International Search Report and Written Opinion dated Jun. 3, 2021.

PCT/US2024/029965 International Search Report and Written Opinion dated Oct. 1, 2024.

U.S. Appl. No. 17/225,307 Office Action dated Jul. 1, 2024.

U.S. Appl. No. 17/759,433 Notice of Allowance dated Mar. 10, 2023.

Co-pending U.S. Appl. No. 19/411,729, inventors Llamazares; Vegh Juan Francisco et al., filed Dec. 8, 2025.

Elliott, Olivia et al. Design and Manufacturing of High Surface Area 3D-Printed Media for Moving Bed Bioreactors for Wastewater Treatment. Journal of Contemporary Water Research & Education. Apr. 2017. 160(1):144-156.

EP20240198520.9 Extended European Search Report dated Jan. 3, 2025.

Fee Conan, et al. 3D-printed porous bed structures. Current Opinion in Chemical Engineering. vol. 18, Nov. 2017, pp. 10-15. DOI:10.1016/j.coche.2017.07.003.

Gabbrielli, Ruggero. Foam geometry and structural design of porous material. Doctoral Thesis, Department of Mechanical Engineering, University of Bath :1-179 (2009).

Maskery I., et al. Effective design and simulation of surface-based lattice structures featuring vol. fraction and cell type grading. Materials & Design. vol. 155, Oct. 5, 2018, pp. 220-232. DOI:10.1016/j.matdes.2018.05.058.

PCT/US2024/029965 International Preliminary Report on Patentability dated Dec. 4, 2025.

PCT/US2024/029965 Invitation to Pay Additional Fees dated Jul. 24, 2024.

PCT/US2024/055879 International Search Report and Written Opinion dated Dec. 23, 2024.

PCT/US2025/031699 International Search Report and Written Opinion dated Oct. 2, 2025.

PCT/US2025/031699 Invitation to Pay Additional Fees dated Aug. 5, 2025.

Peng Hao, et al. Design, Modeling and Characterization of Triply Periodic Minimal Surface Heat Exchangers with Additive Manufacturing. Solid Freeform Fabrication 2019: Proceedings of the 30th Annual International Solid Freeform Fabrication Symposium—An Additive Manufacturing Conference. Dec. 5, 2019. pp. 2325-2337.

Salmean, Christopher et al. 3D-Printed Stationary Phases with Ordered Morphology: State of the Art and Future Development in Liquid Chromatography. Chromatographia. Published: Dec. 14, 2018. vol. 82. pp. 443-463. https://doi.org/10.1007/s10337-018-3671-5.

Stolaroff, Joshuah K. FEW0233: Additive Manufacturing of New Structures for Heat Exchange. Crosscutting Research Program Portfolio Review Meeting. Lawrence Livermore National Laboratory. Apr. 10, 2019. pp. 1-27. Retrieved from the Internet: URL: https://netl.doe.gov/sites/default/files/2019-05/2019_Annual_Reports/Thursday/MaterialsWaterManagement/C8_3-%2020190411_0900C8_FEW0233_LLNL.pdf.

U.S. Appl. No. 17/225,307 Corrected Notice of Allowability dated Feb. 12, 2025.

U.S. Appl. No. 17/225,307 Corrected Notice of Allowability dated Mar. 6, 2025.

U.S. Appl. No. 17/225,307 Corrected Notice of Allowability dated May 20, 2025.

U.S. Appl. No. 17/225,307 Notice of Allowance dated Feb. 3, 2025.

U.S. Appl. No. 18/330,818 Corrected Notice of Allowability dated Dec. 10, 2025.

(56)     References Cited

OTHER PUBLICATIONS

U.S. Appl. No. 18/330,818 Corrected Notice of Allowability dated
Dec. 19, 2025.
U.S. Appl. No. 18/330,818 Notice of Allowance dated Sep. 9, 2025.

Layer side view.

Layer - Layer side view

Layer n₁

Layer n₂

Layer n₃

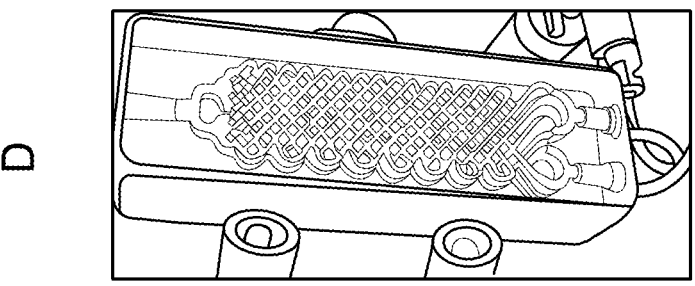
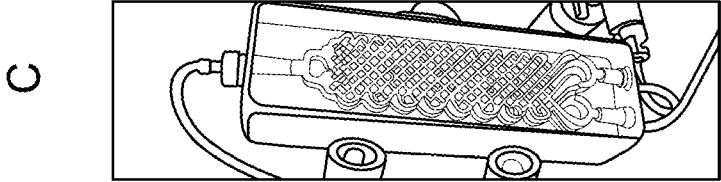
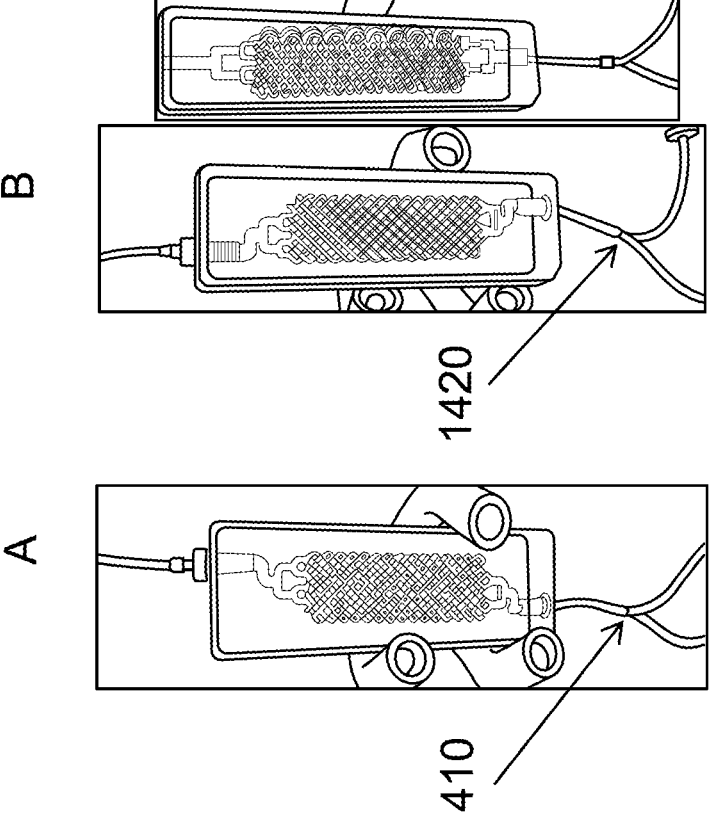
FIG. 14

1510

1602

1601

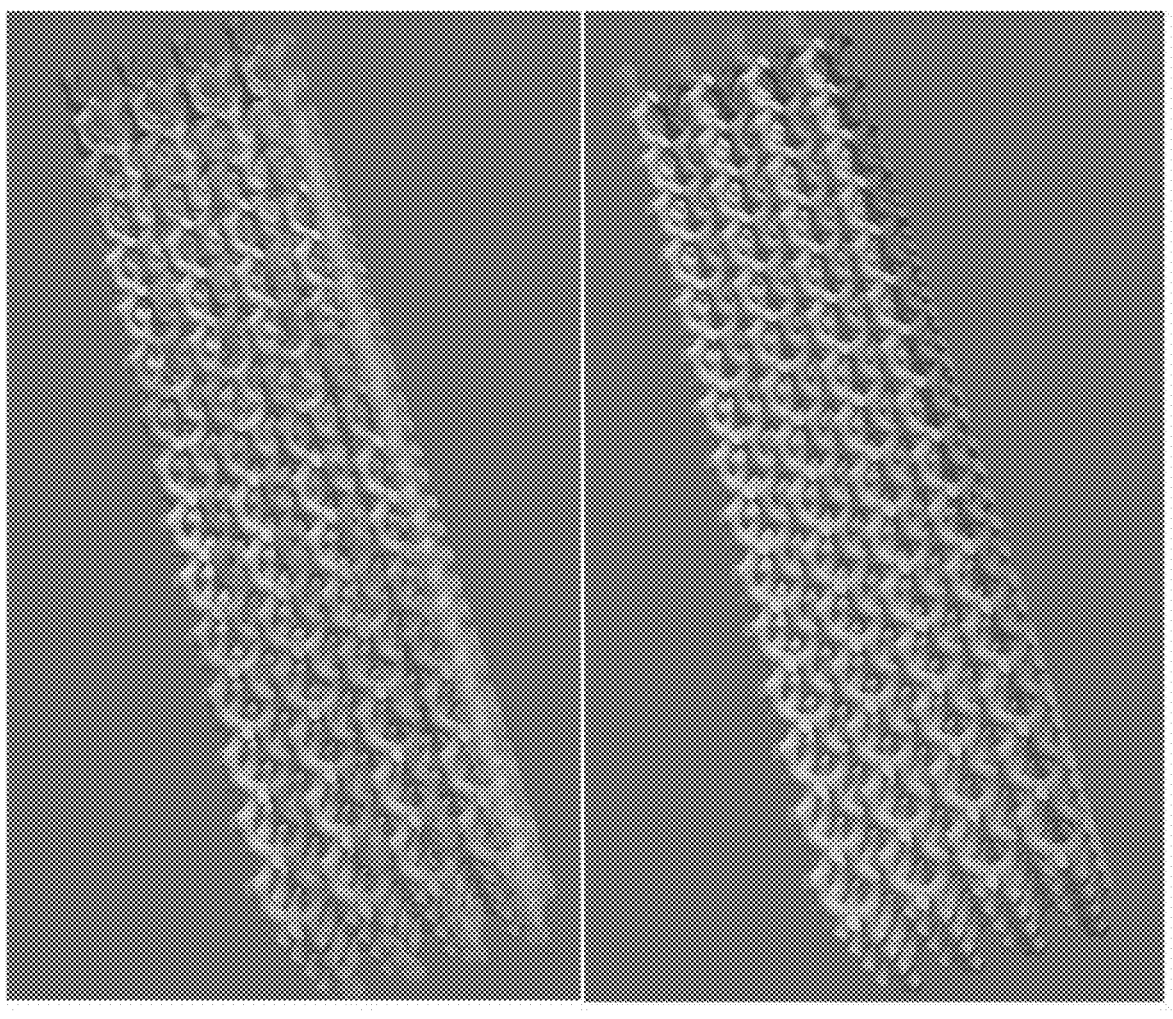
*FIG. 17A*        *FIG. 17B*

CONTINUOUS PURIFICATION DEVICE

CROSS REFERENCE

This application is a by-pass continuation of International Application No. PCT/US2024/029965, filed May 17, 2024, which claims the benefit of U.S. Provisional Application No. 63/503,384, filed May 19, 2023, each of which are entirely incorporated herein by reference.

BACKGROUND

Production of biological products including cells, proteins, and small and large chemical molecules has become an increasing focus in the provision of medical, food, industrial and other types of products. Consistency of the product and the ability to scale production as well as the flexibility to tailor manufacturing to different locations and for environmental conditions are important factors for production.

Bioreactors provide an environment for large scale production of cells and for producing proteins and other molecules from such cells. The separation and/or purification of these molecules is often performed by liquid chromatography, electrophoresis, or centrifugation. However, these techniques are slow and difficult to implement in a continuous process. There is a need to address this problem with a higher efficiency in the separation and/or purification process.

SUMMARY

Provided herein are systems, components, and methods for producing biological products, i.e., cells and proteins, biochemical substances (or molecules), and/or chemical substances (or molecules). More specifically, provided herein are systems, components, and methods for purifying and/or isolating/separating such products. The systems, components and methods herein can address scale, cost, efficiency, and consistency.

In an aspect, the present disclosure provides an apparatus, comprising:

i) a mixing module comprising a first network comprising a first plurality of gyroids configured in layers to provide a first plurality of microchannels, wherein the first plurality of microchannels are fluidically interconnected;

ii) a first port configured to receive a first liquid, wherein the first port comprises a first plurality of sub-ports, each sub-port is in fluid communication with an inlet of a microchannel of a first layer of the first plurality of gyroids;

iii) a second port configured to receive a second liquid, wherein the second port comprises a second plurality of sub-ports, each sub-port is in fluid communication with an inlet of a microchannel of the first layer of the first plurality of gyroids;

iv) a wash module downstream of the mixing module comprising a second network comprising a second plurality of gyroids in fluid communication with the mixing module and configured to provide a second plurality of microchannels, wherein the second plurality of microchannels are fluidically interconnected;

v) a third port configured to receive a third liquid, wherein the third port is upstream of the wash module;

vi) a first separation module downstream of the wash module comprising: at least one channel in fluid communication with the wash module, a fourth port configured to receive a fourth liquid comprising an elution solution; a first transport component configured to interact with the plurality of particles, thereby directing the plurality of particles to the fourth liquid in the at least one channel; and a first outlet and a second outlet each in fluid communication with the at least one channel, wherein the first outlet is configured to receive the fourth liquid and the plurality of particles exiting the wash module and the second outlet is configured to receive remaining liquid;

vii) an elution module downstream of the first separation module comprising a third network of a third plurality of gyroids configured to provide a third plurality of microchannels, wherein the third plurality of microchannels are fluidically interconnected and in fluid communication with the first outlet; and viii) a second separation module downstream of the elution module comprising: at least one channel in fluid communication with the elution module; a fifth port configured to receive a fifth liquid comprising a re-equilibration solution; a third outlet and a fourth outlet each in fluid communication with the at least one channel, wherein the fourth outlet is configured to receive the re-equilibration solution and the plurality of particles exiting the elution module and the third outlet is configured to receive remaining liquid; and a second transport component configured to interact with the plurality of particles, thereby directing the plurality of particles to the re-equilibration solution.

In some embodiments, the elution module further comprises a sixth port configured to receive a sixth liquid comprising an elution solution.

In some embodiments, the apparatus further comprises a third separation module upstream of the wash module and downstream of the third port, comprising at least one channel in fluid communication with the wash and with the mixing module; a third transport component configured to interact with the plurality of particles, thereby directing the plurality of particles to the wash solution in the at least one channel; and a fifth outlet configured to receive a waste stream.

In some embodiments, the apparatus further comprises a third separation module downstream of the mixing module and upstream of the third port, comprising at least one channel in fluid communication with the mixing module; a third transport component configured to interact with the plurality of particles, thereby separating the plurality of particles from a liquid in the at least one channel; and a fifth outlet configured to receive a waste stream.

In some embodiments, the first liquid comprises a substance of interest. In some embodiments, the substance of interest is selected from the group consisting of a cell, a protein, a peptide, an antibody, an antigen binding fragment, an auxotroph, an amino acid auxotroph, a base auxotroph, a natural drug, a semi-synthetic drug, and a synthetic drug. In some embodiments, the substance of interest is a therapeutic protein or antibody.

In some embodiments, the second liquid comprises a plurality of particles. In some embodiments, the plurality of particles comprises one or more nanoparticles. In some embodiments, the one or more nanoparticles comprise magnetic nanoparticles. In some embodiments, the plurality of particles comprises a binding agent. In some embodiments, the binding agent is capable of interacting with the substance of interest. In some embodiments, the binding agent is selected from the group consisting of a protein, an antibody, an antigen binding fragment, and a nucleic acid. In some embodiments, the binding agent is protein A, protein G, protein M, protein L, a recombinant fusion protein thereof, a variant thereof, or a combination thereof.

In some embodiments, the plurality of microchannels of the mixing module, the wash module, and/or the elution module is configured to mix two liquids or a liquid and a plurality of particle.

In some embodiments, the gyroids comprised in the mixing module, the wash module and/or the elution module have a constant cross section.

In some embodiments, the distance traveled by a fluid through the mixing module, the wash module, and/or the elution module is determined by:

$$D = \frac{\left(\dfrac{Q_i + Q_{ii}}{\pi d^2/4}\right) * T_{res} * f_{cor}}{n},$$

wherein:

D is the distance traveled by the fluids;

$Q_i$ is flow rate of liquid i;

$Q_{ii}$ is flow rate of liquid ii;

d is the diameter of the microchannels;

$T_{res}$ is a residence time;

$f_{cor}$ is a correlation factor; and n is number of gyroids.

In some embodiments, the plurality of microchannels in the mixing module, the wash module and/or the elution module have different diameters and/or distance traveled by a fluid. In some embodiments, the plurality of microchannels in the mixing module, the wash module, and/or the elution module are configured to ensure a laminar flow inside the microchannels. In some embodiments, a flow rate ratio of the first liquid to the second liquid is from 1:2 to 1:8. In some embodiments, a flow rate ratio of the first liquid to the second liquid is from 2:1 to 8:1.

In some embodiments, the first transport component and the second transport component each comprise an electromagnetic field. In some embodiments, the electromagnetic field of the first transport component is positioned laterally with respect to the at least one channel of the first separation module. In some embodiments, the electromagnetic field of the second transport component is positioned laterally with respect to the at least one channel of the second separation module.

In some embodiments, the third transport component comprises an electromagnetic field. In some embodiments, the electromagnetic field of the third transport component is positioned laterally with respect to the at least one channel of the third separation module.

In some embodiments, the apparatus further comprises a recycling line configured to redirect the particles from the fourth outlet of the second separation module to the mixing module.

In some embodiments, the at least one channel of the first separation module is configured to not allow mixing of incoming two streams of liquid. In some embodiments, the incoming two streams of liquid comprise the elution solution and a solution from the wash module.

In some embodiments, the at least one channel of the second separation module is configured to not allow mixing of incoming two streams of liquid. In some embodiments, the incoming two streams of liquid comprise the re-equilibrium solution and a solution from the elution module.

In some embodiments, the at least one channel of the third separation module is configured to not allow mixing of incoming two streams of liquid. In some embodiments, the incoming two streams of liquid comprise the wash solution and a solution from the mixing module.

In some embodiments, the wash solution is configured to elute substances that are non-specifically bound to the plurality of particles. In some embodiments, the elution solution is configured to elute the substance of interest from the plurality of particles.

In some embodiments, a gyroid of the first plurality of gyroids, the second plurality of gyroids, and/or the third plurality of gyroids, is a single gyroid or a modified single gyroid.

In some embodiments, a gyroid of the first plurality of gyroids, the second plurality of gyroids, and/or the third plurality of gyroids, is a double gyroid or a modified double gyroid.

In another aspect, the present disclosure provides an apparatus, comprising: a mixing module configured to mix a liquid comprising a substance of interest and a liquid comprising a plurality of particles, wherein the plurality of particles comprises a binding agent configured to capture the substance of interest; a separation module configured to separate the plurality of particles from the liquid; an elution module configured to elute the substance of interest from the plurality of particles; and an additional separation module configured to separate the particles from the eluted substance of interest.

In some embodiments, the separation module further comprises a transport component. In some embodiments, the transport component comprises a magnetic or electromagnetic field configured to interact with the plurality of particles.

In some embodiments, the additional separation module further comprises an additional transport component. In some embodiments, the additional transport component comprises a magnetic or electromagnetic field configured to interact with the plurality of particles.

In some embodiments, the mixing module comprises a constant double gyroid structure.

In some embodiments, the elution module comprises a constant double gyroid structure.

In some embodiments, the separation module is downstream of the mixing module.

In some embodiments, the second separation module is downstream of the elution module.

In some embodiments, the apparatus further comprises a wash module downstream of the mixing module, configured to remove substances that are bound non-specifically to the plurality of particles.

In another aspect, the present disclosure provides a method of purifying a substance of interest, comprising: directing a first liquid comprising the substance of interest into a first module of an apparatus disclosed herein, directing a second liquid comprising a plurality of particles into the first module of the apparatus, and flowing the first liquid and the second liquid through the apparatus.

In some embodiments, the first liquid comprises a medium from a reactor, processor, bio-reactor, or bio-processor.

In some embodiments, the substance of interest is selected from the group consisting of a cell, a protein, a peptide, an antibody, an antigen binding fragment, an auxotroph, an amino acid auxotroph, a base auxotroph, a natural drug, a semi-synthetic drug and a synthetic drug. In some embodiments, the substance of interest is an antibody.

In some embodiments, the plurality of particles comprises one or more nanoparticles. In some embodiments, the one or more nanoparticles comprise magnetic nanoparticles. In some embodiments, the one or more nanoparticles are coated with a binding agent. In some embodiments, the binding agent is capable of interacting with the substance of interest. In some embodiments, the binding agent is selected from the group consisting of a protein, an antibody, an antigen binding fragment, and a nucleic acid. In some embodiments, the binding agent is protein A, protein G, protein M, protein L, a recombinant fusion protein thereof, a variant thereof, or a combination thereof.

In some embodiments, a flow rate ratio of the first liquid and the second liquid is from 1:4 to 4:1.

In some embodiments, the method further comprises directing a wash solution to the apparatus.

In some embodiments, the method further comprises directing an elution solution to the first separation module.

In some embodiments, the method further comprises directing a re-equilibrium solution to the second separation module.

In another aspect, the present disclosure provides a method of manufacturing a purification device, the method comprising: providing a 3D model design of the purification device comprising a plurality of microchannels; converting the 3D model design into slice files; transmitting the slice files to a vat polymerization or stereolithographic 3D printing device; formulating a resin and feeding the resin into the stereolithographic 3D printing device; and printing layer-by-layer to generate the purification device.

In some embodiments, the method further comprises creating a constructive solid geometry (CSG) tree for the 3D model design.

In some embodiments, the method further comprises representing the 3D model design as signed distance function.

In some embodiments, the method further comprises rendering the 3D model design by utilizing ray marching.

In some embodiments, the plurality of microchannels have a gyroid configuration or a modified gyroid configuration.

In some embodiments, the plurality of microchannels are arranged in a plurality of layers.

In some embodiments, the resin comprises at least one photoinitiator and at least one photopolymer.

In some embodiments, printing layer-by-layer comprises printing a first layer; projecting one or more beams using an optical assembly to solidify the resin; and printing a second layer. In some embodiments, the method further comprises moving the optical assembly along the z-axis while printing layer-by-layer.

In some embodiments, the optical assembly comprises a static optical assembly.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings (also "figure" and "FIG." herein), of which:

FIG. 14 shows the mixing efficiency of architectures A-D;

FIGS. 17A and 17B show the mixing efficiency with a feeding tree to feed each gyroid from two ports with asymmetrical flow.

DETAILED DESCRIPTION

Figures 1A, 1B, 1C, 1D, 1E, 1F:
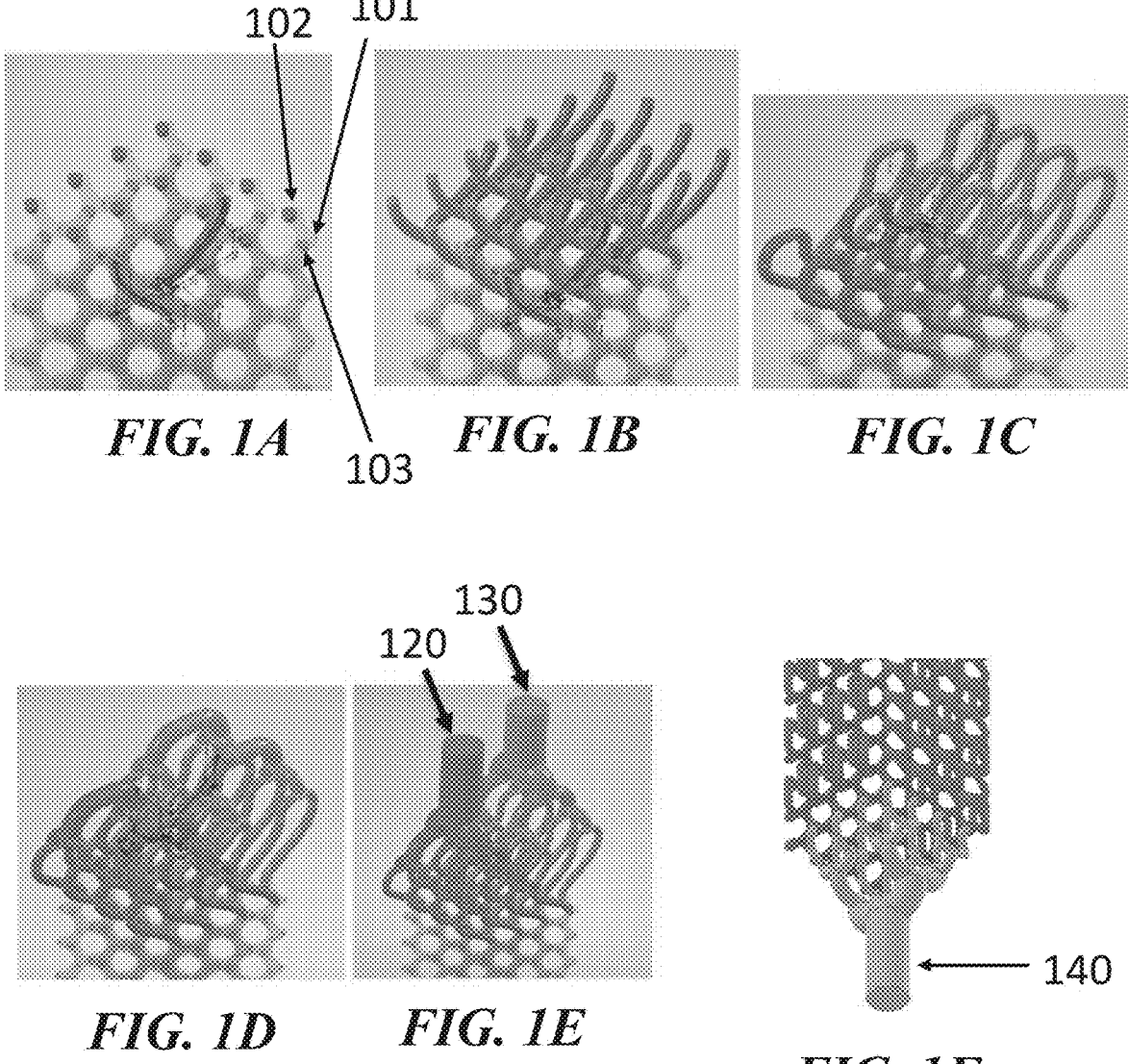
FIGS. 1A-1F illustrate the connection of ports 120 and 130 with the first layer of gyroids, and the exit port 140.

While various embodiments of the present application have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Throughout this application, various embodiments may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

As used in the specification and claims, the singular forms "a," "an," and "the" include plural references unless the context clearly dictates otherwise. For example, the term "a sample" includes a plurality of samples, including mixtures thereof.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

"About" with reference to a number refers to that number plus or minus 15% of that number. The term "about" a range refers to that range minus 15% of its lowest value and plus 15% of its greatest value.

The term "purification device" or "purification apparatus," as used herein, generally refers to a device suitable for purification and production of biological, chemical, or biochemical products. In some embodiments, the purification device can purify a biological, chemical, or biochemical product in a small scale (e.g., micrograms, milligrams, or grams). In some embodiments, the purification device can be scaled to purify a biological, chemical, or biochemical product in a larger scale (e.g., grams, kilograms, or tons). In some embodiments, the purification device can run in a continuous mode. In some embodiments, the purification device can run in a batch mode.

The term "minimodule," as used herein, generally refers to a segment of a module (e.g., mixing module, elution module, etc.) that may be fluidically interconnected and assembled into a larger structure (e.g., macrostructure or macroshape) to constitute at least a portion or an entirety of the module.

The term "gyroid," as used herein, generally refers to a connected periodic minimal surface containing no straight lines. Such surface may have a mathematically infinite number of connections. In some examples, a gyroid is a unique non-trivial embedded member of the associate family of the Schwarz P and D surfaces with angle of association approximately 38.01°. A gyroid may be configured as a single gyroid or a double gyroid. In some embodiments, a gyroid can be a modified single gyroid. In some embodiments, a gyroid can be a modified double gyroid. A gyroid may be oriented and configured for a particular application in a microfluidic device. The double gyroid may be configured by balancing geometric aspects related to fluid dynamic performances observed in minimodules and macrostructures (e.g., macroshapes), such as the double gyroids crystallographic structure and space group. The single gyroid or double gyroid may be implemented in a variety of crystallographic structures.

The term "particles," as used herein, generally refers to substances that are in a solid form. Particles can comprise beads, such as magnetic beads, latex beads, fluorescent beads, or streptavidin beads. The particles can comprise nanorods, nanospheres, nanocubes, nanowires, nanofibers and/or nanotubes. The particles can have a variety of shapes, which can be regular or irregular. The particles can have a size from about 5 nanometers to about 100 micrometers. The beads can comprise nanobeads or microbeads. The particles can comprise a coating on its surface, for example, an adsorptively or covalently bound silane coating through selected coupling chemistries, thereby coating the surface of the particles with functional groups. In some embodiments, silanes can comprise amino silanes, e.g., p-aminopropyltrimethoxysilane, N-2-aminoethyl-3-aminopropyltrimethoxysilane, or triaminofunctional silane, n-dodecyltriethoxysilane, and n-hexyltrimethoxysilane. Alternatively or in addition to, the particles can comprise no coating on its surface. In some embodiments, the particles can comprise a coating on its surface, for example, a metal (e.g., a noble metal) or an organic polymer or oligomer.

The term "magnetic particles," as used herein, generally refers to particles which can be attracted or attractable by a magnetic field. The magnetic particles can comprise a magnetic core, e.g., a magnetic metal or metal oxide core. In some embodiments, magnetic particles can comprise paramagnetic particles (e.g., aluminum) that are slightly attracted by a magnetic field and do not retain the magnetic properties when the external field is removed. In some embodiments, magnetic particles can comprise a particle with a metallic coating, such as coating with a noble metal. Magnetic particles can also comprise superparamagnetic and/or ferromagnetic (e.g., iron, cobalt, nickel, or alloy thereof) particles.

The term "substance of interest," as used herein, can include one or more biological, biochemical or chemical molecules, or a combination thereof. Non-limiting examples of substance of interest can comprise antibodies, proteins, small molecules, therapeutics, peptides, exosomes, nucleic acids, organic molecules, cells, auxotrophs, amino acid auxotrophs, base auxotrophs, natural drugs, semi-synthetic drugs, and synthetic drugs.

Provided herein are systems, components and methods for purifying substances of interest, e.g., proteins and other biological, biochemical or chemical substances.

In some embodiments, the system is a modular system. In some embodiments, the system comprises a plurality of modules. The systems provide a purification system, e.g., a continuous purification system, such that the substance of interest moves from one functionality/module (e.g., mixing with particles) to the next functionality/module (e.g., washing, separation liquid phase from particles, elution) without leaving the system. In the purification systems herein, the design and interconnection of the modules flows the substance of interest from one functionality/module to the next. The systems, components, and methods herein provide flexibility to tailor purification for different types of substances. The systems, components, and methods also provide flexibility of scale. For example, the systems, components, and methods described herein may provide for scale-up of purification for different starting volumes and concentrations of starting material containing the substance of interest.

Included herein in the systems and components are one or more modules for purifying substances of interest. The systems and methods of use are advantageous in their scalability, flexibility, effectiveness (e.g., achieving a desired level of purity and/or removing certain undesired substances), and conservation of resources.

Purification Device and System

Provided herein are systems and components for purifying biological products, biochemical, or chemical substances. The systems and components can be modular (e.g., comprising or involving a module or a plurality of modules as the basis of design or construction) and interconnectable.

In some embodiments, the system comprises one or more modules. In some embodiments, the system comprises at least one, at least two, at least three, at least four, at least five, at least six, or more modules. In some embodiments, the system comprises more than three modules. In some embodiments, one or more modules are configured for laminar flow of liquid (e.g., media and/or solvents). In some embodiments, one or more modules are configured for tangential flow.

In some embodiments, the one or more modules in the system can be interconnected.

Mixing Module

In some embodiments, the system comprises one or more mixing modules. In some embodiments, the mixing module is configured to mix a liquid and particles. In some embodiments, the mixing module is configured to mix two liquid streams. In some embodiments, the liquid can comprise a substance of interest. In some embodiments, the substance of interest can comprise a cell, a protein, an antibody, an antigen binding fragment, a nucleic acid, an auxotroph, an amino acid auxotroph, a base auxotroph, a natural drug, a semi-synthetic drug, a synthetic drug, or a combination thereof. In some embodiments, the substance of interest can comprise a therapeutic protein or antibody. For example, the substance of interest may be an antibody or antibody-like molecule such as a full length monoclonal antibody (mAb), a Fragment antigen-binding antibody (Fab), a Single-chain variable fragment (scFv), a nanobodies (also referred to as a single variable domain on a heavy chain (VHH) antibody or single domain antibody), a multispecific antibody such as a bispecific antibody, an antibody conjugate such as an antibody drug conjugate (ADC), an affibody, a DARPin, or an antigen binding fragment. In some embodiments, the particles comprise a plurality of particles.

In some embodiments, the particles can comprise a binding agent. In some embodiments, the binding agent can interact with a substance of interest in the liquid. In some embodiments, the binding agent can capture a substance of interest in the liquid. The binding agent can be bound (e.g., covalently or noncovalently, directly or through a linker, e.g., streptavidin-biotin, silanes, glutaraldehydes, or the like) to a particle (e.g., a microsphere, microbead, a nanoparticle, nanosphere, or the like). In some embodiments, the particles can comprise a coating, for example, streptavidin coating or a biotin coating, that may interact with a substance of interest in the liquid. The binding agent can bind directly to the substance of interest and can be specific for that substance of interest. Non-limiting examples of binding agent comprise, but are not limited to, peptides, polypeptides, polynucleotides, antigens, polysaccharides, lipids, small molecules (e.g., a drug or other small molecule that interacts with a region or binding pocket or surface of the substance of interest), proteins, antibodies, fragment of antibodies, antigen binding fragments, nucleic acids, or molecular imprinted polymers (MIP). In some embodiments, the particle can comprise one or more types of binding agents. In some embodiments, the particles can comprise a mixture of particles that comprise different binding agents. In some embodiments, the binding agent can comprise an immunoglobulin (Ig, e.g., IgM, IgG, IgA, IgE, or IgD) binding protein. In some embodiments, the immunoglobulin binding protein can have an antibody binding profile that enables the immunoglobulin binding protein to bind to at least a portion of an antibody that is recognized by the immunoglobulin binding protein. In some embodiments, the binding agent can comprise protein A, protein G, protein M, protein L, a recombinant fusion protein thereof, a variant thereof, or any combination thereof. In some embodiments, the binding agent can comprise protein G. In some embodiments, the binding agent can comprise protein M. In some embodiments, the binding agent can comprise protein A/G. Protein G generally refers to an immunoglobulin-binding protein expressed in group C and G Streptococcal bacteria. Protein G can have a molecular weight of 65 kilodaltons (kDa) (G148 protein G) or 58 kDa (C40 protein G). Protein A generally refers to a 42 kDa protein originally found in the cell wall of the bacteria *Staphylococcus aureus*. Protein A may comprise five homologous Ig-binding domains that fold into a three-helix bundle wherein each domain may be able to bind proteins from many mammalian species, e.g., IgG. Protein A may bind the heavy chain within the Fc region of an immunoglobulin and within the Fab region of the human VH3 family. Protein L generally refers to an Ig binding protein that may bind Ig through L chain interaction. Protein L may be isolated from the surface of bacterial species *Peptostreptococcus magnus*. Protein A/G generally refers to a recombinant fusion protein that combines IgG binding domains of both protein A and protein G. Protein A/G may comprise four Fc binding domains from protein A and two from protein G, yielding a final mass of 50,460 daltons. In some embodiments, protein A/G may bind to all subclasses of human IgG. In some embodiments, protein A/G may bind to IgA, IgE, IgM and IgD. Protein M generally refers to an immunoglobulin-binding protein originally found on the cell surface of the human pathogenic bacterium *Mycoplasma genitalium*. In some embodiments, a variant can comprise at least a modification to the sequence of the protein, e.g., a substitution, an insertion, a deletion, or a combination thereof.

In some embodiments, the particles can comprise magnetic particles. In some embodiments, the particles can comprise paramagnetic, superparamagnetic, or ferromagnetic particles. In some embodiments, the size of the particles can be from about 5 nanometers (nm) to about 100 nm, from about 5 nm to about 500 nm, from about 5 nm to about 1000 nm, from about 5 nm to about 5000 nm, from about 5 nm to about 10 μm, from about 5 nm to about 100 μm, from about 100 nm to about 500 nm, from about 100 nm to about 1000 nm, from about 100 nm to about 5000 nm, from about 100 nm to about 10 μm, from about 100 nm to about 100 μm, from about 500 nm to about 1000 nm, from about 500 nm to about 5000 nm, from about 500 nm to about 10 μm, from about 500 nm to about 100 μm, from about 1000 nm to about 5000 nm, from about 1000 nm to about 10 μm, from about 1000 nm to about 100 μm, from about 5 μm to about 10 μm, from about 5 μm to about 100 μm, from about 10 μm to about 100 μm, or larger. In some embodiments, the particles can comprise magnetic microparticles. In some embodiments, the particles can comprise magnetic nanoparticles. In some embodiments, the particles can comprise paramagnetic, superparamagnetic, or ferromagnetic microparticles or nanoparticles. In some embodiments, the particles can comprise microparticles having a size greater than about 1000 nm. In some embodiments, the particles can comprise nanoparticles having a size less than about 1000 nm.

In some embodiments, the mixing module can comprise a gyroid structure. In some embodiments, the mixing module can comprise a single gyroid (SG) or a modified single gyroid structure. In some embodiments, the mixing module can comprise a double-gyroid or modified double-gyroid shape. A double gyroid (DG) may comprise two gyroids, and may include two intergrown nonoverlapping domains. A modified double gyroid (DG) may include two intergrown nonoverlapping domains, which in some instances (but not others) may be bounded by two constant-mean-curvature (CMC) surfaces separated by a matrix phase. A modified single gyroid structure may comprise minor modifications to the connections of a non-modified single gyroid in order to adapt the structure to a given macrostructure or function. In some embodiments, the modified single gyroid structure may comprise a modification to a shape, an orientation, an angle, a length, a curvature, a diameter of a channel, or a thickness of a channel wall, of a single gyroid structure. A modified double gyroid structure may comprise minor modifications to the connections of a non-modified double gyroid in order to adapt the structure to a given macrostructure or function. In some embodiments, the modified double gyroid structure may comprise a modification to a shape, an orientation, an angle, a length, a curvature, a diameter of a channel (or microchannel), or a thickness of a channel (or microchannel) wall, of a double gyroid structure. In some embodiments, modifications may include blocking of a portion of the connections or intersections (e.g., "mouths"), modifying the diameter of at least one channel, or complete or partial elimination of any of the channels present in a single gyroid or DG structure. A DG or modified DG may include a first gyroid structure intertwined with a second gyroid structure. In some embodiments, a DG is selected to provide a reduction or more efficient volume occupation.

In some embodiments, the mixing module comprises a series of minimodules assembled into a macrostructure. In some embodiments, the minimodules may be arranged in layers or shapes within the macrostructure, for example, to form one or more channels. An assembly of interconnected minimodules which are oriented identically is referred to as a "layer." In some embodiments, the layer can be arranged, for example, in a rhomboid shape. In some embodiments, the layer is arranged in a square shape. The minimodules can be assembled in an x-y-z coordinate system and be proportional to the direction in which the layers expand in the coordination system.

In some examples, a first assembly of layers of minimodules ("first matrix") can be co-located with a second assembly of layers of minimodules ("second matrix") whereby the second matrix occupies the free spaces left by the first matrix and whereby the matrices occupying the same volume have no point of contact and maintain a constant minimum distance.

In some embodiments, both matrices can be fed from one common port. In some embodiments, both matrices can be fed by 2 ports that subdivide dichotomously at least one, at least 2, at least 3, at least 4, at least 5, at least 6, at least 10, at least 15, at least 20, or more times. In some embodiments, each matrix can be fed independently.

In some embodiments, the diameter of the microchannel of the gyroids can vary. In some embodiments, the minimodules can have a regular cubic wrap structure having a length "L" of its edge. L can be related to the sweeping diameter. In some embodiments, L is equal to the two thirds of the sweeping diameter of a microchannel, times the square root of two, times the square root of three. In some embodiments, the radius of the components can be different. In some embodiments when both radii are equal, the microchannel radius may not be greater than 0.7 times the sweeping radius. The shortest distance between two minimodules of two different faces is equal to the sweeping radius times the square root of two, minus the addition of each component channel radius.

In some embodiments, the area of the first channel with a DG and the area of the second channel within a DG may be different. In some embodiments, the area of the first channel with a DG may be equivalent to the area of the second channel within a DG, and wherein the area of the matrix phase is the sum of the area of the first channel and the area of the second channel. The distance between the matrix phase separating the channels and the center of each channel may be constant.

In some embodiments, the gyroid (e.g., a single gyroid or a double gyroid) can have a constant cross section area. In some embodiments, the cross-section area of a gyroid can be varied. In some embodiments, the DG has a constant cross section area, i.e., the DG is a constant double gyroid (CDG).

In some embodiments, the mixing module has a first port to the first layer of the gyroids, e.g., SG or DG, through which a first liquid is provided. In some embodiments, the mixing module has a second port to the first layer of the gyroids, e.g., SG or DG, through which a second liquid is provided. In some embodiments, the first liquid comprises the substance of interest. In some embodiments, the second liquid comprises the plurality of particles. In some embodiments, the first port comprises a first plurality of sub-ports, wherein each of the first plurality of sub-ports connects with an inlet of one microchannel of the first layer of the gyroids, e.g., SG or DG. In some embodiments, the first port subdivides dichotomously once to two sub-ports. In some embodiments, each of the two sub-ports subdivides dichotomously, thereby forming four sub-ports. In some embodiments, the four sub-ports further subdivide dichotomously. In some embodiments, the first port subdivides dichotomously at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, or more times to form the first plurality of sub-ports. The total number of sub-ports (and corresponding dichotomous subdivision) can be determined by the number of the microchannels. In some embodiments, the number of the microchannels of the mixing module is substantively equal to the number of the first plurality of sub-ports.

In some embodiments, the second port comprises a second plurality of sub-ports, wherein each of the second plurality of sub-ports connects with an inlet of one microchannel of the first layer of the gyroids, e.g., SG or DG. In some embodiments, the second port subdivides dichotomously once to two sub-ports. In some embodiments, each of the two sub-ports subdivides dichotomously, thereby forming four sub-ports. In some embodiments, the four sub-ports further subdivide dichotomously. In some embodiments, the second port subdivides dichotomously at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, or more times to form the second plurality of sub-ports. The total number of sub-ports (and corresponding dichotomous subdivision) can be determined by the number of the microchannels. In some embodiments, the number of the microchannels of the mixing module is substantively equal to the number of the second plurality of sub-ports.

In some embodiments, each microchannel of the first layer of the gyroids, e.g., SG or DG is connected to a sub-port of the first port and a sub-port of the second port, such that each microchannel receives a portion of the first liquid and a portion of the second liquid.

FIGS. 1A-1F illustrate the connection of ports with the first layer of the gyroids. The first layer of the gyroids has n*m microchannels, where n and m are the sides of the cross section of the matrix and/or matrices; for FIGS. 1A-1F, this is 16 (4*4) microchannels. Each of the microchannels, e.g., 101 (shown in FIG. 1A), is connected with a sub-port, e.g., 102 (shown in FIG. 1A) from a first port 120 (shown in FIG. 1E) and a sub-port, e.g., 103, from a second port 130 (shown in FIG. 1E). Each of ports 120 and 130 subdivide dichotomously to form the number of sub-ports as determined by the number of microchannels. For example, each of ports 120 and 130 subdivide dichotomously four times to 16 sub-ports as shown in FIG. 1E. FIG. 1F illustrates the connection of port 140 with the last layer of the gyroids. The plurality of the gyroids of the last layer merges to form at least one exit port 140.

Figure 2:
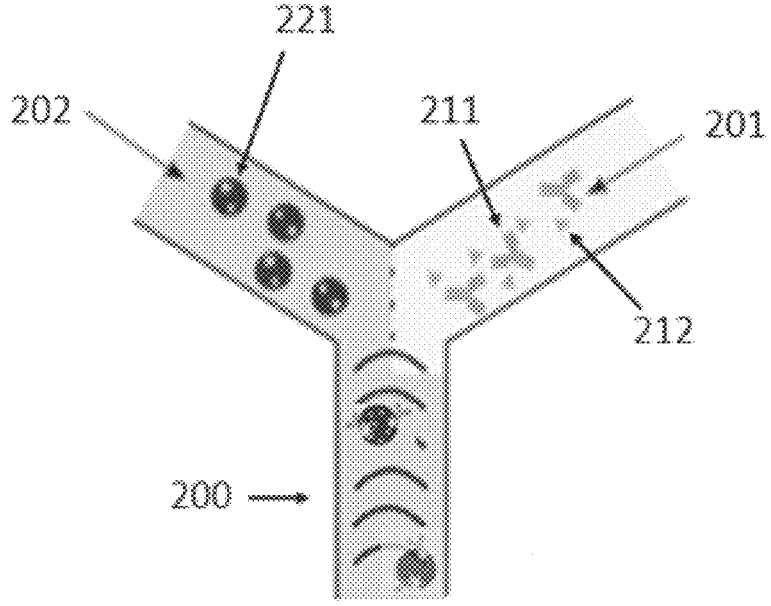
FIG. 2 shows a schematic and simplified portion of a minimodule of the first layer of the mixing module.

FIG. 2 shows a schematic and simplified portion of a minimodule of the first layer of the mixing module. Sub-port 201 is configured for receiving a liquid comprising substances of interest 211, and the liquid can comprise substances, e.g., 212 that are not of interest. Sub-port 202 is configured for receiving a liquid comprising particles 221. The two liquid streams contact and mix together to form a mixed stream 200. The mixing module is configured such that the two liquid streams have sufficient mixing. During the mixing process, the substance of interest 211 can be bound to the particles 221. In some embodiments, a sub-population of substances not of interest may also bound to the particles non-specifically. In some embodiments, the substance not of interest may not bind to the particles.

In some embodiments, the mixing module is configured for sufficient mixing of the liquid and the particles so that the substances in the liquid can bind to or be captured by the particles. In some embodiments, the mixing module is configured for laminar flow inside the microchannels. In some embodiments, the mixing module is configured for a non-laminar flow inside the microchannels. In some embodiments, a flow rate of the first liquid is higher than a flow rate of the second liquid. In some embodiments, a flow rate ratio of the first liquid to the second liquid is from 2:1 to 8:1. In some embodiments, a flow rate ratio of the first liquid to the second liquid is from 3:1 to 4:1. In some embodiments, a flow rate of the second liquid is higher than a flow rate of the first liquid. In some embodiments, a flow rate ratio of the first liquid to the second liquid is from 1:2 to 1:8. In some embodiments, a flow rate ratio of the first liquid to the second liquid is from 1:3 to 1:4. In some embodiments, a flow rate of the first liquid is equal to a flow rate of the second liquid.

In some embodiments, the distance traveled by the fluids through the mixing module can be determined by:

$$D = \frac{\left(\frac{Q_1 + Q_2}{\pi d^2/4}\right) * T_{res} * f_{cor}}{n}$$

wherein:
D is distance traveled by the fluids;
$Q_1$ is flow rate of the first liquid;
$Q_2$ is a flow rate of the second liquid;
d is the diameter of the microchannels;
$T_{res}$ is a residence time;
$f_{cor}$ is a correlation factor; and
n is the number of gyroids.

In some embodiments, the number of gyroids can range, for example from 50 gyroids to $2 \times 10^9$ gyroids, from 500 gyroids to $2 \times 10^9$ gyroids, for example 500 DGs to $2 \times 10^9$ DGs. In some instances, the number of gyroids can range, from 100 gyroids to $4 \times 10^9$ gyroids, for example from 1000 gyroids to $4 \times 10^9$ gyroids, for example 1000 single gyroids to $4 \times 10^9$ single gyroids. In some embodiments, $Q_1$ is from about 1 mL/day to about 1000 L/day. In some embodiments, $Q_2$ is from about 0.1 mL/day to about 500 L/day. In some embodiments, d is from about 25 to about 3000 mm. In some embodiments, $T_{res}$ is from about 1 second to about 24 hours. In some embodiments, $f_{cor}$ is from about 1.6 to about 2.6.

In some embodiments, the mixing module is configured for laminar flow. Laminar flow can reduce the shear and stress on the substance of interest. In some embodiments, the mixing module is configured for transition flow or turbulent flow to achieve mixing of the substance of interest and the particles. In some embodiments, the mixing module is configured for transition flow or turbulent flow and the particles used therewith are microparticles. In some embodiments, mixing is achieved by premixing the liquid containing the substance of interest and the particles and then the mixture is flown to/applied to the purification device.

In some embodiments, the plurality of the gyroids of the last layer of the mixing module merges at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, or more times to form at least one exit port from the mixing module.

Separation Module

In some embodiments, the purification device comprises a separation module. In some embodiments, the separation module is downstream of the mixing module to receive the mixed stream from the mixing module. In some embodiments, the separation module is configured to separate the particles from the liquid phase. In some embodiments, the separation module is configured to separate the particles from the liquid phase and direct the separated particles toward or into another liquid phase (such as the third liquid stream described herein).

In some embodiments, the particles, e.g., magnetic particles, are separated from the liquid phase by a transport component. In some embodiments, the transport component comprises a filter, a membrane, an acoustic fluidic, a magnetic field, or an electromagnetic field. In some embodiments, the transport component comprises a magnetic field.

In some embodiments, the separation module comprises at least one channel. In some embodiments, the at least one channel is configured for tangential flow. In some embodiments, if two liquid streams are fed into the channel, the two liquid streams do not mix with each other. In some embodiments, the particles transport from the mixed stream to a third liquid stream that is flown into the separation module. In some embodiments, the third liquid stream comprises an elution solution or a wash solution.

Figure 3:
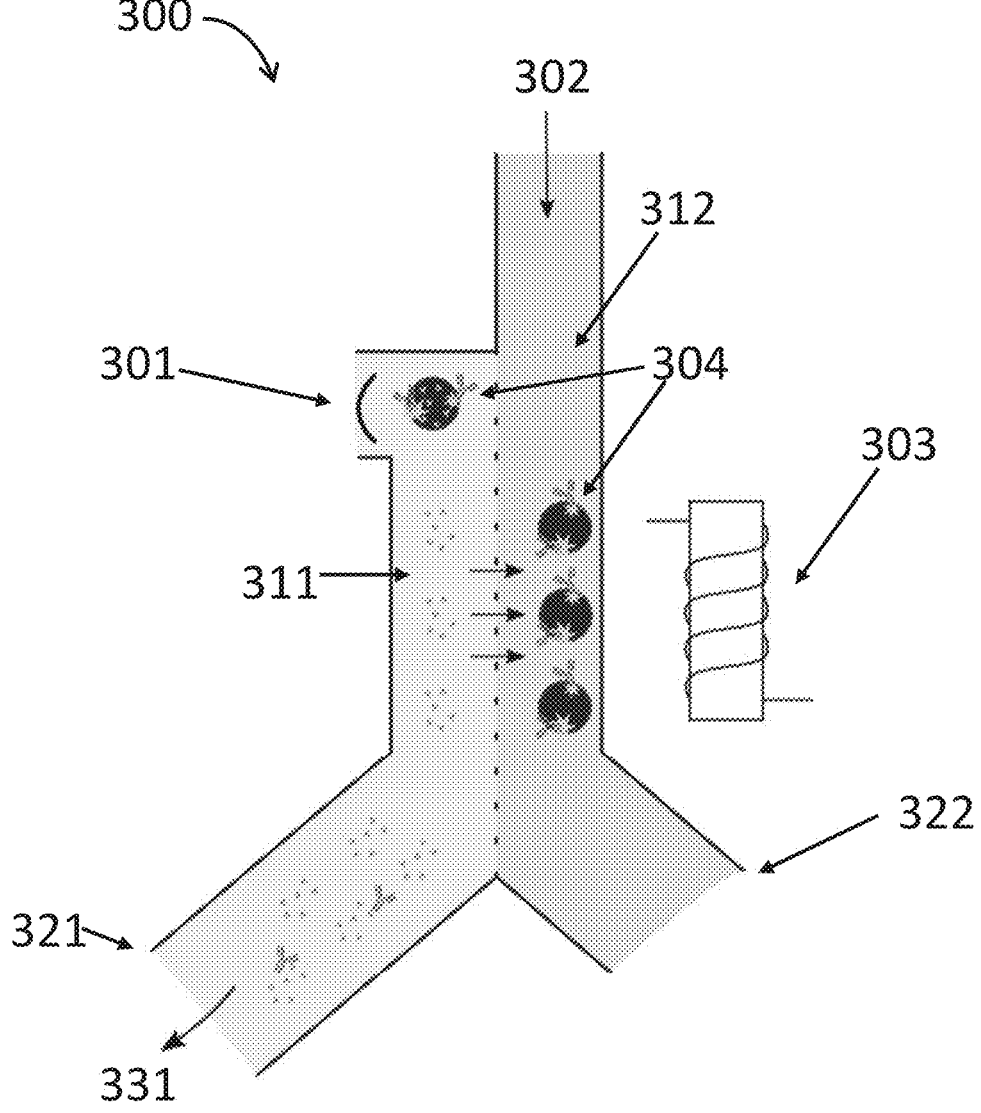
FIG. 3 shows an exemplary separation module 300.

FIG. 3 shows an exemplary schematic separation module 300. The separation module 300 comprises a port 301 to receive the mixed stream, wherein the mixed stream comprises a liquid phase 311 comprising the first liquid and the second liquid that are mixed in the mixing module, and the particles 304. A third liquid stream 312 comprising a solution, e.g., an elution solution is introduced into the separation module 300 through a port 302. The liquid phase 311 and the third liquid stream 312 flow in the separation module 300 substantially without mixing. The particles 304 are attracted by the transport component 303 and transport from the mixed stream to the third liquid stream 312. The transport component 303 can comprise a magnetic or electromagnetic field. After the separation, the third liquid stream comprising the particles flow out of the separation module through an exit port 322. The liquid phase 311, from which the particles have been substantially removed, flows out of the separation module through an exit port 321 as a waste stream 331, wherein the waste stream 331 comprises the first liquid, the second liquid, and any unbound substances therefrom.

Elution Module

In some embodiments, the purification device comprises an elution module. In some embodiments, the elution module is configured for sufficient mixing of the particles and an elution solution. In some embodiments, the substance of interest that is captured by or bound to the particles is eluted off the particles in the elution module. In some embodiments, the particles are brought to contact with an elution solution. In some embodiments, the elution module comprises a single gyroid or modified single gyroid structure as disclosed herein. In some embodiments, single gyroids are assembled into a network comprising a plurality of single gyroids configured to provide one or more microchannels. In some embodiments, the single gyroids are constant single gyroids. In some embodiments, the elution module comprises a double gyroid (DG) or modified double gyroid structure as disclosed herein. In some embodiments, DGs are assembled into layers. In some embodiments, DGs are assembled into a network comprising a plurality of DGs configured to provide one or more microchannels. In some embodiments, the DG is a CDG.

In some embodiments, the elution module is downstream of the separation module to receive the third liquid stream comprising the particles from the separation module. In some embodiments, the third liquid stream comprising the particles is in fluidic communication with the inlet of the first layer of the gyroids, e.g., SG or DG. In some embodiments, the third liquid stream comprising the particles is distributed to the microchannels through a port that is subdivided dichotomously at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, or more times to a plurality of sub-ports. In some embodiments, each of the sub-ports is connected to an inlet of a microchannel of the first layer of the gyroids, e.g., SG or DG. In some embodiments, the elution module comprises a port to receive an additional elution solution. In some embodiments, no additional elution solution is added. In some embodiments, the port subdivides dichotomously to a plurality of sub-ports that each of the sub-ports is connected to an inlet of the first layer of the gyroids, e.g., SG or DG.

In some embodiments, an elution solution can comprise an acidic solution. In some embodiments, an elution solution can comprise a basic solution. In some embodiments, an elution solution can comprise hydrochloric acid (HCl), guanidine·HCl, acetic acid, citric acid, formic acid, trichloroacetic acid, salicylic acid, sulfosalicylic acid, or a combination thereof. In some embodiments, an elution solution can comprise hydroxide (e.g., sodium hydroxide, potassium hydroxide, ammonium hydroxide), bicarbonate (e.g., sodium bicarbonate), alkoxide (e.g., sodium methoxide, sodium glycoxide), triethylamine, triethanolamine, deoxycholate, urea, sodium iodide, sodium thiocyanate, lithium chloride, sodium chloride, magnesium chloride, or a combination thereof. In some embodiments, an elution solution can comprise a surfactant, a detergent, a salt, or an organic solvent (e.g., methanol, ethanol, isopropanol, acetonitrile, hexane, chloroform, dichloromethane, dimethyl sulfoxide, dioxane, ethylene glycol). In some embodiments, an elution solution can comprise disulfide bond reducers, e.g., 2-mercaptoethanol, dithiothreitol, or tris(2-carboxylethyl)phosphine. In some embodiments, an elution solution can comprise an enzyme (e.g., a protein digestive enzyme).

In some embodiments, the distance traveled by the fluids through the elution module can be determined by:

$$D = \frac{\left(\frac{Q_a + Q_b}{\pi d^2/4}\right) * T_{res} * f_{cor}}{n}$$

wherein:

D is a distance traveled by the fluids;

$Q_a$ is a flow rate of a liquid stream a;

$Q_b$ is a flow rate of a liquid stream b;

d is the diameter of the microchannels;

$T_{res}$ is a residence time;

$f_{cor}$ is a correlation factor; and n is number of gyroids.

In some embodiments, $Q_a$ is the flow rate of the third liquid stream comprising the particles from the separation module and $Q_b$ is the flow rate of the additional elution solution. In some embodiments, the additional elution solution is absent, and accordingly, $Q_b$ is zero.

In some embodiments, a flow rate of the third liquid is higher than a flow rate of the additional elution solution. In some embodiments, a flow rate ratio of the third liquid to the additional elution solution is from 2:1 to 8:1. In some embodiments, a flow rate ratio of the third liquid to the additional elution solution is from 3:1 to 4:1. In some embodiments, a flow rate of the additional elution solution is higher than a flow rate of the third liquid. In some embodiments, a flow rate ratio of the third liquid to the additional elution solution is from 1:2 to 1:8. In some embodiments, a flow rate ratio of the third liquid to the additional elution solution is from 1:3 to 1:4. In some embodiments, a flow rate of the third liquid is equal to a flow rate of the additional elution solution.

In some embodiments, the number of gyroids can range, for example from 50 gyroids to $2\times10^9$ gyroids, from 500 gyroids to $2\times10^9$ gyroids, for example 500 DGs to $2\times10^9$ DGs. In some instances, the number of gyroids can range, for example from 100 gyroids to $4\times10^9$ gyroids, from 1000 gyroids to $4\times10^9$ gyroids, for example 1000 single gyroids to $4\times10^9$ single gyroids. In some embodiments, $Q_a$ is from about 1 mL/day to about 1000 L/day. In some embodiments, $Q_b$ is from about 0.1 mL/day to about 500 L/day. In some embodiments, d is from about 25 to about 3000 mm. In some embodiments, $T_{res}$ is from about 1 second to about 24 hours. In some embodiments, $f_{cor}$ is from about 1.6 to about 2.6.

In some embodiments, the elution module is configured for laminar flow.

In some embodiments, the exit stream from the elution module comprises a liquid stream comprising the elution solution, the particles, and the substance of interest that is eluted from the particles. In some embodiments, the plurality of the gyroids of the last layer of the elution module merges at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, or more times to form at least one exit port from the elution module.

Additional Separation Module

In some embodiments, the purification device comprises an additional separation module configured to separate the plurality of particles from the liquid phase and the eluted substance of interest.

In some embodiments, the additional separation module is downstream of the elution module to receive the exit stream (e.g., the eluted solution) from the elution module.

In some embodiments, the particles, e.g., magnetic particles, are separated from the liquid phase and the eluted substance of interest by an additional transport component. In some embodiments, the additional transport component comprises a magnetic or electromagnetic field.

In some embodiments, the additional separation module can comprise a separation module as disclosed herein. In some embodiments, the additional separation module comprises at least one channel. In some embodiments, the at least one channel is configured for tangential flow. In some embodiments, if two liquid streams are fed into the channel, the two liquid streams substantially do not mix with each other. In some embodiments, the particles transport from the exit stream (e.g., the eluted solution from the elution module) to a fourth liquid stream that is flown into the additional separation module. In some embodiments, the fourth liquid stream comprises an equilibrium or re-equilibrium solution.

Figure 4:
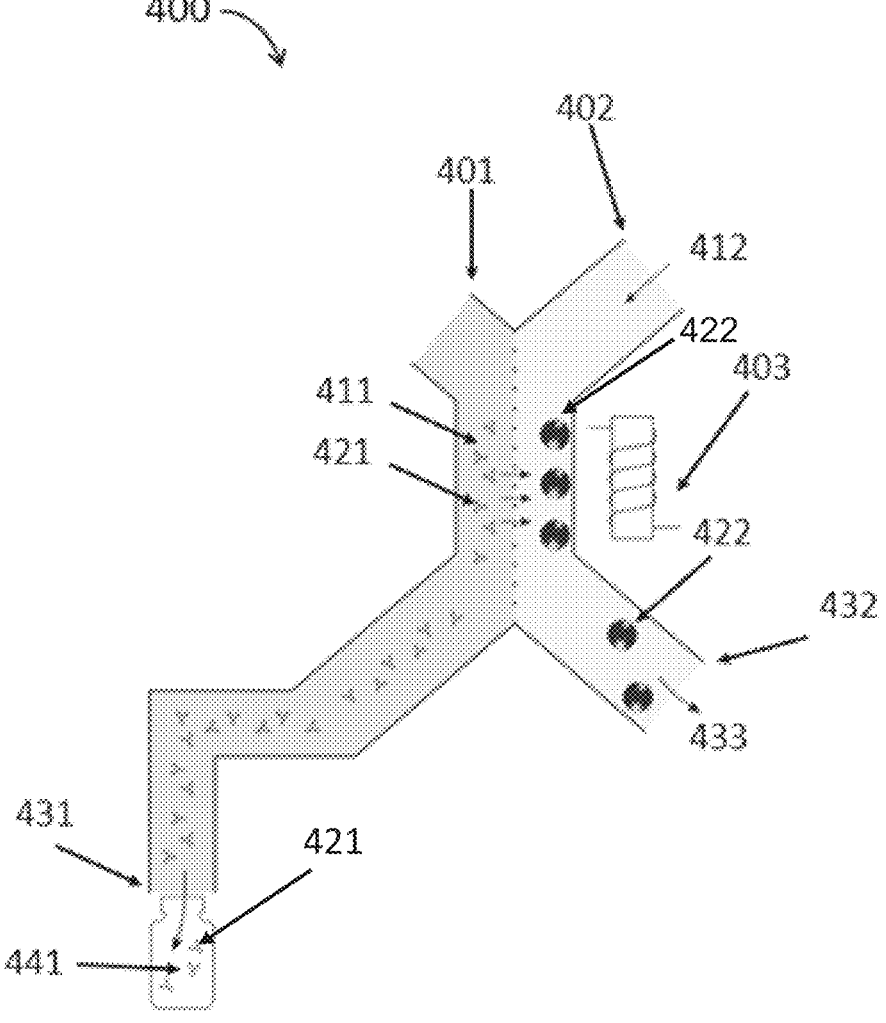
FIG. 4 shows an exemplary additional separation module 400.

FIG. 4 shows an exemplary schematic additional separation module 400. The additional separation module 400 comprises a port 401 to receive the exit stream (e.g., the eluted solution) from the elution module, wherein the exit stream comprises a liquid phase 411 comprising the elution solution, the eluted substance of interest 421, and the particles 422. A fourth liquid stream 412 comprising an equilibrium or re-equilibrium solution is introduced into the additional separation module 400 through a port 402. The liquid phase 411 and the fourth liquid stream 412 flow in the additional separation module 400 without mixing. The particles 422 interact with and are attracted by the transport component 403 and transport from the liquid phase 411 to the fourth liquid stream 412. The transport component 403 can comprise a magnetic or electromagnetic field. After the separation, the fourth liquid stream 433 comprising the particles flow out of the additional separation module through an exit port 432. The liquid phase 411 comprising the substance of interest 421 flow out of the additional separation module 400 through an exit port 431. The liquid phase 411 comprising the substance of interest 421 is collected by a receiving container 441, thereby generating purified substance of interest 421. The purified substance of interest 421 can be subject to additional purification or processing.

In some embodiments, the stream 433 comprising the equilibrium or re-equilibrium solution and the particles (i.e., recycled particles) can be collected by a receiving container. In some embodiments, the stream 433 can be supplied to the mixing module directly as the second liquid. In some embodiments, the particles (i.e., recycled particles) can be separated from the stream 433 and supplied to the mixing module. In some embodiments, further treatment to the particles (i.e., recycled particles) can be performed before supplying to the mixing module. In some embodiments, the further treatment can comprise washing, cleaning, or coating with additional binding agents.

Wash Module

In some embodiments, the purification device can further comprise an additional mixing module (i.e., a wash module or a washing module) upstream of the separation module. In some embodiments, the additional mixing module can comprise a port to receive a fifth liquid stream. In some embodiments, the fifth liquid stream can comprise a wash solution. In some embodiments, the wash solution can interact with the particles and wash off substances that are captured, bound, or absorbed by the particles non-specifically. In some embodiments, the substances that are captured or absorbed by the particles non-specifically are not substances of interest. In some embodiments, a wash solution can be selected based on the substance of interest and potential substance not of interest in the sample. In some embodiments, a wash solution can comprise a buffer solution. In some embodiments, a wash solution can comprise low concentration acidic, basic or salt solution. In some embodiments, a wash solution can comprise a Tris(Hydroxymethyl)aminomethane (TRIS) buffer or a phosphate-buffered saline (PBS) solution. In some embodiments, a wash solution can comprise a detergent.

In some embodiments, the wash module is downstream of the mixing module to receive the mixed stream from the mixing module. In some embodiments, the wash module comprises a single gyroid or modified single gyroid structure as disclosed herein. In some embodiments, single gyroids are assembled into a network comprising a plurality of single gyroids configured to provide one or more microchannels. In some embodiments, the single gyroids are constant single gyroids. In some embodiments, the wash module comprises a double gyroid (DG) or modified double gyroid structure as disclosed herein. In some embodiments, the gyroids are assembled into layers. In some embodiments, the gyroids are assembled into a network comprising a plurality of gyroids, e.g., SGs or DGs configured to provide one or more microchannels. In some embodiments, the DG is a CDG.

In some embodiments, the mixed stream is in fluidic communication with the inlet of the first layer of the gyroids, e.g., SG or DG. In some embodiments, the mixed stream is distributed to the microchannels through a port that is subdivided dichotomously at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, or more times to a plurality of sub-ports. In some embodiments, each of the sub-ports is connected to an inlet of a microchannel of the first layer of the gyroids, e.g., SG or DG. In some embodiments, the wash module comprises a port to receive a wash solution. In some embodiments, the port receiving the wash solution subdivides dichotomously to a plurality of sub-ports that each of the sub-ports is connected to an inlet of the first layer of the gyroids, e.g., DG.

In some embodiments, the distance traveled by the fluids through the wash module can be determined by:

$$D = \frac{\left(\dfrac{Q_I + Q_{II}}{\pi d^2/4}\right) * T_{res} * f_{cor}}{n}$$

wherein:

D is distance traveled by the fluids;

$Q_I$ is flow rate of a liquid stream I;

$Q_{II}$ is a flow rate of a liquid stream II;

d is the diameter of the microchannels;

$T_{res}$ is a residence time;

$f_{cor}$ is a correlation factor; and n is number of gyroids.

In some embodiments, $Q_I$ is the flow rate of the mixed stream from the mixing module and $Q_{II}$ is the flow rate of the wash solution. In some embodiments, the wash solution is absent, and accordingly, $Q_{II}$ is zero.

In some embodiments, a flow rate of mixed stream from the mixing module is higher than a flow rate of the wash solution. In some embodiments, a flow rate ratio of the mixed stream from the mixing module to the wash solution is from 2:1 to 8:1. In some embodiments, a flow rate ratio of the mixed stream from the mixing module to the wash solution is from 3:1 to 4:1. In some embodiments, a flow rate of the wash solution is higher than a flow rate of mixed stream from the mixing module. In some embodiments, a flow rate ratio of mixed stream from the mixing module to the wash solution is from 1:2 to 1:8. In some embodiments, a flow rate ratio of mixed stream from the mixing module to the wash solution is from 1:3 to 1:4. In some embodiments, a flow rate of the mixed stream from the mixing module is equal to a flow rate of the wash solution.

In some embodiments, the number of gyroids can range, for example from 50 gyroids to $2\times10^9$ gyroids, from 500 gyroids to $2\times10^9$ gyroids, for example 500 DGs to $2\times10^9$ DGs. In some instances, the number of gyroids can range, for example from 100 gyroids to $4\times10^9$ gyroids, from 1000 gyroids to $4\times10^9$ gyroids, for example 1000 single gyroids to $4\times10^9$ single gyroids. In some embodiments, $Q_I$ is from about 1 mL/day to about 1000 L/day. In some embodiments, $Q_{II}$ is from about 0.1 mL/day to about 500 L/day. In some embodiments, d is from about 25 to about 3000 mm. In some embodiments, $T_{res}$ is from about 1 second to about 24 hours. In some embodiments, $f_{cor}$ is from about 1.6 to about 2.6.

In some embodiments, the wash module is configured for laminar flow.

In some embodiments, the plurality of the gyroids of the last layer of the washing module merges at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, or more times to form at least one exit port from the washing module.

In some embodiments, the purification device can comprise an optional separation module downstream of the mixing module and upstream of the wash module. In some embodiments, the optional separation module can be configured to separate the plurality of particles bound with the substance of interest and substance not of interest from the liquid phase from the mixing module. In some embodiments, the optional separation module can be configured to direct the plurality of particles to a clean wash solution, thereby removing any unbound substances. In some embodiments, the optional separation module can comprise any of the separation module disclosed herein. In some embodiments, the optional separation module can comprise (i) at least one channel in fluid communication with the mixing module; (ii) a port configured to receive a liquid comprising a wash solution; (iii) a transport component configured to interact with the plurality of particles, thereby directing the plurality of particles to the wash solution in the at least one channel; and (iv) an outlet configured to receive a waste stream.

Apparatus for Purifying a Substance of Interest

In some embodiments, the present disclosure provides an apparatus for purifyiing a substance of interest, comprising: a mixing module as disclosed herein, configured to mix a liquid comprising a substance of interest and a liquid comprising a plurality of particles, wherein the plurality of particles comprises a binding agent configured to capture the substance of interest; a separation module as disclosed herein, configured to separate the plurality of particles comprising bound substance of interest from the liquid; an elution module as disclosed herein, configured to elute the substance of interest from the plurality of particles; and an additional separation module configured to separate the particles from the eluted substance of interest. In some embodiments, the separation module further comprises a transport component as disclosed herein. In some embodiments, the transport component comprises an electromagnetic or magnetic field configured to interact with the plurality of particles. In some embodiments, the additional separation module further comprises an additional transport component as disclosed herein. In some embodiments, the additional transport component comprises an electromagnetic or magnetic field configured to interact with the plurality of particles. In some embodiments, the mixing module comprises a gyroid structure (e.g., a single gyroid, a double gyroid, a constant double gyroid structure). In some embodiments, the elution module comprises a gyroid structure (e.g., a single gyroid, a double gyroid, a constant double gyroid structure). In some embodiments, the separation module is downstream of the mixing module. In some embodiments, the additional separation module is downstream of the elution module. In some embodiments, the apparatus further comprises a wash module as disclosed herein, downstream of the mixing module, configured to remove substances that are bound non-specifically to the plurality of particles.

Figure 5:
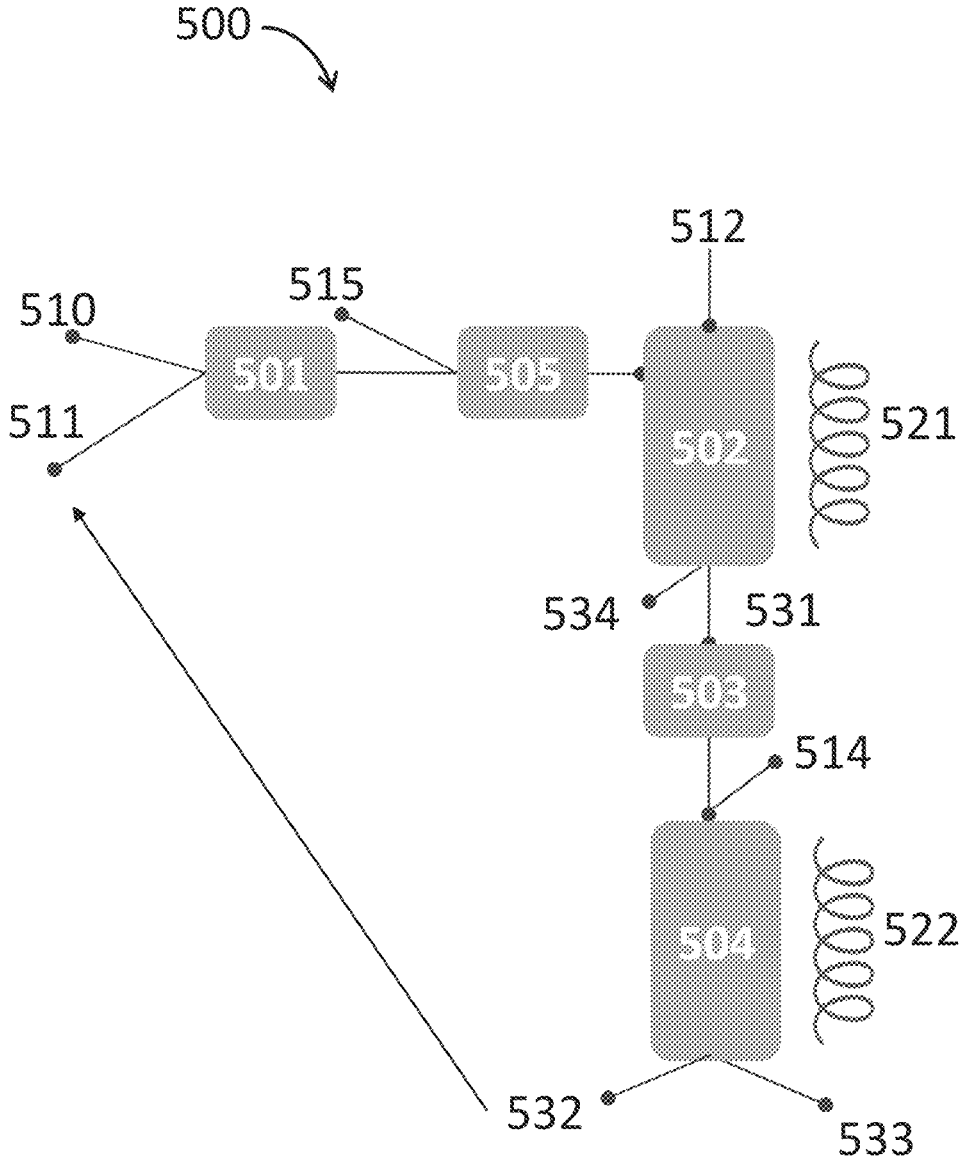
FIG. 5 shows a non-limiting example of a purification device 500.

FIG. 5 shows a non-limiting example of a purification device 500. The purification device comprises a mixing module 501, e.g., a first DG module (e.g., a constant double gyroids (CDG) module) or a first SG module. The mixing module 501 comprises a first network comprising a first plurality of gyroids, e.g., SGs or DGs (e.g., CDGs), configured to provide a first plurality of microchannels, wherein the first plurality of microchannels is fluidically interconnected. The purification device 500 comprises a first port 510 and a second port 511. The first port 510 is configured to receive a first liquid comprising a substance of interest. The second port 511 is configured to receive a second liquid comprising a plurality of particles, wherein the plurality of particles comprises a binding agent. The first port and second port are in fluid communication with an inlet of each of the first layer of the first plurality of gyroids, e.g., SGs or DGs (e.g., CDGs). In some embodiments, the first port comprises a first plurality of sub-ports subdivided dichotomously at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, or more times from the first port and each sub-port of the first plurality of sub-ports is connected with an inlet of a microchannel of the first layer of the first plurality of gyroids, e.g., SGs or DGs (e.g., CDGs). In some embodiments, the second port comprises a second plurality of sub-ports subdivided dichotomously at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, or more times from the second port and each sub-port of the second plurality of sub-ports is connected with an inlet of a microchannel of the first layer of the first plurality of gyroids, e.g., SGs or DGs (e.g., CDGs). The purification device 500 comprises a wash module 505, e.g., a second gyroid module (e.g., a SG. DG e.g., CDG module), downstream of the mixing module 501. The wash module 505 comprises a second network comprising a second plurality of gyroids, e.g., SGs or DGs (e.g., CDGs) in fluid communication with the mixing module 501 and configured to provide a second plurality of microchannels, wherein the second plurality of microchannels are fluidically interconnected. The purification device 500 comprises a third port 515 configured to receive a third liquid comprising a wash solution, wherein the third port is upstream of the wash module 505. The purification device 500 further comprises a first separation module 502 downstream of the wash module 505. The first separation module 502 comprises (i) at least one channel in fluid communication with the wash module, (ii) a fourth port 512 configured to receive a fourth liquid comprising an elution solution; (iii) a first transport component 521 configured to interact with the plurality of particles, thereby directing the plurality of particles to the fourth liquid in the at least one channel; (iv) a first outlet 531 and a second outlet 534 each in fluid communication with the at least one channel, wherein the first outlet 531 is configured to receive the fourth liquid and the plurality of particles exiting the first separation module and direct it to the next module; and the second outlet 534 is configured to receive remaining liquid and direct the remaining liquid out of the purification module. The purification device 500 further comprises an elution module 503, e.g., a third gyroid module (e.g., a SG, DG e.g., CDG module), downstream of the first separation module 502. The elution module 503 comprises a third network of a third plurality of gyroids, e.g., SGs or DGs (e.g., CDGs) configured to provide a third plurality of microchannels, wherein the third plurality of microchannels are fluidically interconnected and in fluid communication with the first outlet 531. The purification device 500 further comprises a second separation module 504 downstream of the elution module 503. The second separation module 504 comprises (i) at least one channel in fluid communication with the elution module; (ii) a fifth port 514 configured to receive a fifth liquid comprising a re-equilibration solution; (iii) a third outlet 533 and a fourth outlet 532 each in fluid communication with the at least one channel, wherein the fourth outlet 532 is configured to receive the re-equilibration solution and the plurality of particles exiting the second separation module and the third outlet 533 is configured to receive remaining liquid comprising the purified substance of interest; and (iv) a second transport component 522 configured to interact with the plurality of particles, thereby directing the plurality of particles to the re-equilibration solution. The plurality of particles exiting the second separation module can be fed into the mixing module with or without further treatment.

Figure 6:
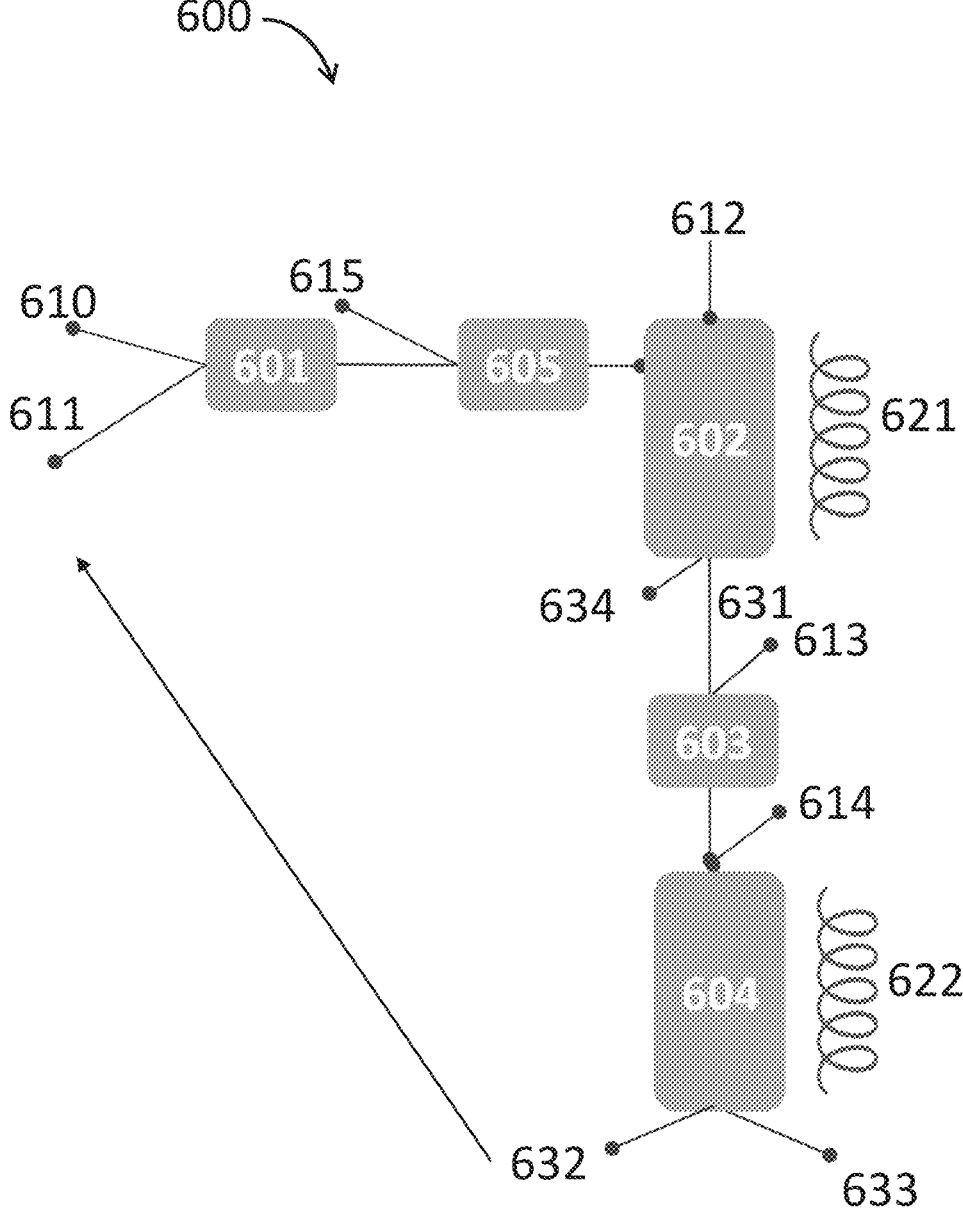
FIG. 6 shows a non-limiting example of a purification device 600.

FIG. 6 shows a non-limiting example of a purification device 600. The purification device comprises a mixing module 601, e.g., a first gyroid module (e.g., a SG, DG e.g., CDG module). The mixing module 601 comprises a first network comprising a first plurality of gyroids, e.g., SGs or DGs (e.g., CDGs) configured to provide a first plurality of microchannels, wherein the first plurality of microchannels is fluidically interconnected. The purification device 600 comprises a first port 610 and a second port 611. The first port 610 is configured to receive a first liquid comprising a substance of interest. The second port 611 is configured to receive a second liquid comprising a plurality of particles, wherein the plurality of particles comprises a binding agent. The first port and second port are in fluid communication with an inlet of each of the first layer of the first plurality of gyroids, e.g., SGs or DGs (e.g., CDGs). In some embodiments, the first port comprises a first plurality of sub-ports subdivided dichotomously from the first port and each sub-port of the first plurality of sub-ports is connected with an inlet of the first layer of the first plurality of gyroids, e.g., SGs or DGs (e.g., CDGs). In some embodiments, the second port comprises a second plurality of sub-ports subdivided dichotomously from the second port and each sub-port of the second plurality of sub-ports is connected with an inlet of the first layer of the first plurality of gyroids, e.g., SGs or DGs (e.g., CDGs). The purification device 600 comprises a wash module 605, e.g., a second gyroid module (e.g., a SG, DG e.g., CDG module), downstream of the mixing module 601. The wash module 605 comprises a second network comprising a second plurality of gyroids, e.g., SGs or DGs (e.g., CDGs) in fluid communication with the mixing module 601 and configured to provide a second plurality of microchannels, wherein the second plurality of microchannels are fluidically interconnected. The purification device 600 comprises a third port 615 configured to receive a third liquid comprising a wash solution, wherein the third port is upstream of the wash module 605. The purification device 600 further comprises a first separation module 602 downstream of the wash module 605. The first separation module 602 comprises (i) at least one channel in fluid communication with the wash module, (ii) a fourth port 612 configured to receive a fourth liquid comprising an elution solution; (iii) a first transport component 621 configured to interact with the plurality of particles, thereby directing the plurality of particles to the fourth liquid in the at least one channel; (iv) a first outlet 631 and a second outlet 634 each in fluid communication with the at least one channel, wherein the first outlet 631 is configured to receive the fourth liquid and the plurality of particles exiting the first separation module and direct it to the next module; and the second outlet 634 is configured to receive remaining liquid and direct the remaining liquid out of the purification device. The purification device 600 further comprises an elution module 603, e.g., a third gyroid module (e.g., a SG, DG e.g., CDG module), downstream of the first separation module 602. The elution module 603 comprises a third network of a third plurality of gyroids, e.g., SGs or DGs (e.g., CDGs) configured to provide a third plurality of microchannels, wherein the third plurality of microchannels are fluidically interconnected and in fluid communication with the first outlet 631. The elution module 603 can further comprise an additional port 613 configured to receive an additional liquid comprising an elution solution. The purification device 600 further comprises a second separation module 604 downstream of the elution module 603. The second separation module 604 comprises (i) at least one channel in fluid communication with the elution module; (ii) a fifth port 614 configured to receive a fifth liquid comprising a re-equilibration solution; (iii) a third outlet 633 and a fourth outlet 632 each in fluid communication with the at least one channel, wherein the fourth outlet 632 is configured to receive the re-equilibration solution and the plurality of particles exiting the second separation module and the third outlet 633 is configured to receive remaining liquid comprising the purified substance of interest; and (iv) a second transport component 622 configured to interact with the plurality of particles, thereby directing the plurality of particles to the re-equilibration solution. The plurality of particles exiting the second separation module can be fed into the mixing module with or without further treatment.

Figure 7:
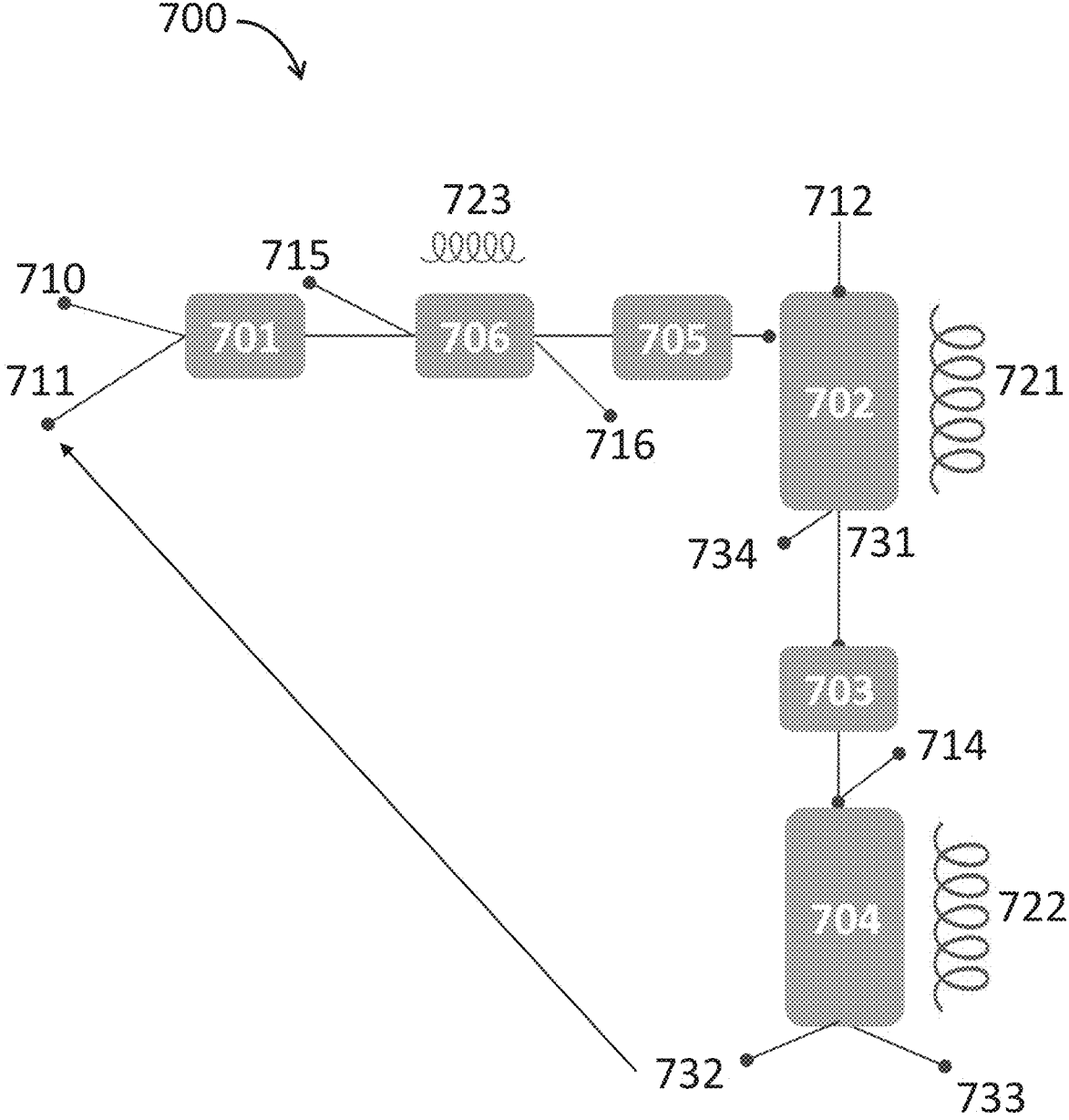
FIG. 7 shows a non-limiting example of a purification device 700.

FIG. 7 shows a non-limiting example of a purification device 700. The purification device comprises a mixing module 701, e.g., a first gyroid module (e.g., a SG, DG e.g., CDG module). The mixing module 701 comprises a first network comprising a first plurality of gyroids, e.g., SGs or DGs (e.g., CDGs) configured to provide a first plurality of microchannels, wherein the first plurality of microchannels are fluidically interconnected. The purification device 700 comprises a first port 710 and a second port 711. The first port 710 is configured to receive a first liquid comprising a substance of interest. The second port 711 is configured to receive a second liquid comprising a plurality of particles, wherein the plurality of particles comprises a binding agent. The first port and second port are in fluid communication with an inlet of each of the first layer of the first plurality of gyroids, e.g., SGs or DGs (e.g., CDGs). In some embodiments, the first port comprises a first plurality of sub-ports subdivided dichotomously from the first port and each sub-port of the first plurality of sub-ports is connected with an inlet of the first layer of the first plurality of gyroids, e.g., SGs or DGs (e.g., CDGs). In some embodiments, the second port comprises a second plurality of sub-ports subdivided dichotomously from the second port and each sub-port of the second plurality of sub-ports is connected with an inlet of the first layer of the first plurality of gyroids, e.g., SGs or DGs (e.g., CDGs). The purification device 700 further comprises a separation module 706 (the third separation module as disclosed herein) downstream of the mixing module 701. The separation module 706 comprises (i) at least one channel in fluid communication with the mixing module 701; (ii) a third port 715 configured to receive a liquid comprising a wash solution; (iii) a transport component 723 (the third transport component as disclosed herein) configured to interact with the plurality of particles, thereby directing the plurality of particles to the wash solution in the at least one channel; and (iv) an outlet 716 configured to receive a waste stream. The purification device 700 further comprises a wash module 705, e.g., a second gyroid module (e.g., a SG, DG e.g., CDG module), downstream of the separation module 706. The wash module 705 comprises a second network comprising a second plurality of gyroids, e.g., SGs or DGs (e.g., CDGs) in fluid communication with the separation module 706 and configured to provide a second plurality of microchannels, wherein the second plurality of microchannels are fluidically interconnected. The purification device 700 further comprises a first separation module 702 downstream of the wash module 705. The first separation module 702 comprises (i) at least one channel in fluid communication with the wash module, (ii) a fourth port 712 configured to receive a fourth liquid comprising an elution solution; (iii) a first transport component 721 configured to interact with the plurality of particles, thereby directing the plurality of particles to the fourth liquid in the at least one channel; (iv) a first outlet 731 and a second outlet 734 each in fluid communication with the at least one channel, wherein the first outlet 731 is configured to receive the fourth liquid and the plurality of particles exiting the first separation module and the second outlet 734 is configured to receive remaining liquid. The purification device 700 further comprises an elution module 703, e.g., a third gyroid module (e.g., a SG, DG e.g., CDG module), downstream of the first separation module 702. The elution module 703 comprises a third network of a third plurality of gyroids, e.g., SGs or DGs (e.g., CDGs) configured to provide a third plurality of microchannels, wherein the third plurality of microchannels are fluidically interconnected and in fluid communication with the first outlet 731. The purification device 700 further comprises a second separation module 704 downstream of the elution module 703. The second separation module 704 comprises (i) at least one channel in fluid communication with the elution module; (ii) a fifth port 714 configured to receive a fifth liquid comprising a re-equilibration solution; (iii) a third outlet 733 and a fourth outlet 732 each in fluid communication with the at least one channel, wherein the fourth outlet 732 is configured to receive the re-equilibration solution and the plurality of particles exiting the second separation module and the third outlet 733 is configured to receive remaining liquid comprising the purified substance of interest; and (iv) a second transport component 722 configured to interact with the plurality of particles, thereby directing the plurality of particles to the re-equilibration solution. The plurality of particles exiting the second separation module can be fed into the mixing module with or without further treatment.

Figure 8:
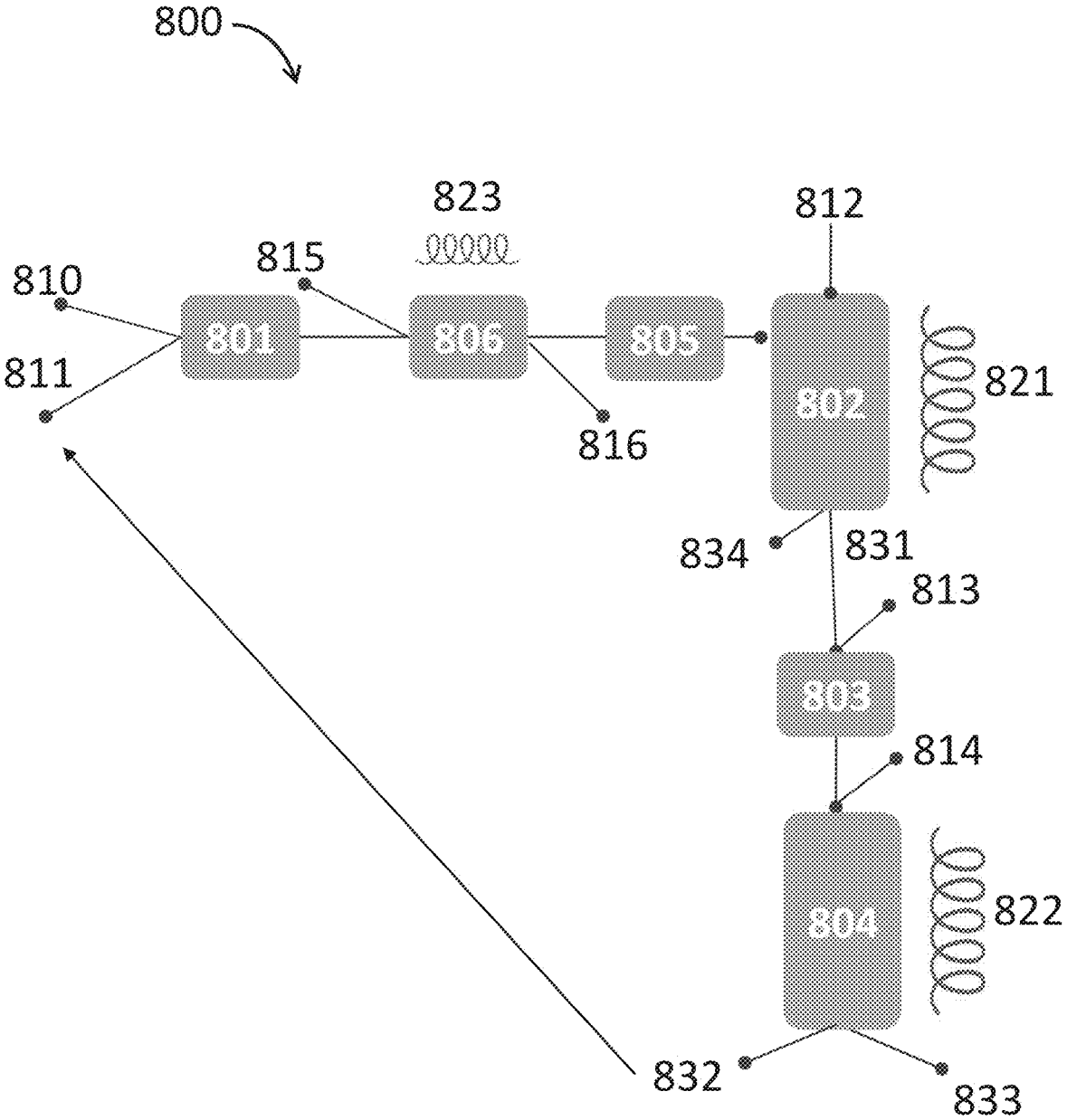
FIG. 8 shows a non-limiting example of a purification device 800.

FIG. 8 shows a non-limiting example of a purification device 800. The purification device comprises a mixing module 801, e.g., a first gyroid module (e.g., a SG, DG e.g., CDG module). The mixing module 801 comprises a first network comprising a first plurality of gyroids, e.g., SGs or DGs (e.g., CDGs) configured to provide a first plurality of microchannels, wherein the first plurality of microchannels are fluidically interconnected. The purification device 800 comprises a first port 810 and a second port 811. The first port 810 is configured to receive a first liquid comprising a substance of interest. The second port 811 is configured to receive a second liquid comprising a plurality of particles, wherein the plurality of particles comprises a binding agent. The first port and second port are in fluid communication with an inlet of each of the first layer of the first plurality of gyroids, e.g., SGs or DGs (e.g., CDGs). In some embodiments, the first port comprises a first plurality of sub-ports subdivided dichotomously from the first port and each sub-port of the first plurality of sub-ports is connected with an inlet of the first layer of the first plurality of gyroids, e.g., SGs or DGs (e.g., CDGs). In some embodiments, the second port comprises a second plurality of sub-ports subdivided dichotomously from the second port and each sub-port of the second plurality of sub-ports is connected with an inlet of the first layer of the first plurality of gyroids, e.g., SGs or DGs (e.g., CDGs). The purification device 800 further comprises a separation module 806 (the third separation module as disclosed herein) downstream of the mixing module 801. The separation module 806 comprises (i) at least one channel in fluid communication with the mixing module 801; (ii) a third port 815 configured to receive a liquid comprising a wash solution; (iii) a transport component 823 (the third transport component as disclosed herein) configured to interact with the plurality of particles, thereby directing the plurality of particles to the wash solution in the at least one channel; and (iv) an outlet 816 configured to receive a waste stream. The purification device 800 further comprises a wash module 805, e.g., a second gyroid module (e.g., a SG, DG e.g., CDG module), downstream of the separation module 806. The wash module 805 comprises a second network comprising a second plurality of gyroids, e.g., SGs or DGs (e.g., CDGs) in fluid communication with the separation module 806 and configured to provide a second plurality of microchannels, wherein the second plurality of microchannels are fluidically interconnected. The purification device 800 further comprises a first separation module 802 downstream of the wash module 805. The first separation module 802 comprises (i) at least one channel in fluid communication with the wash module, (ii) a fourth port 812 configured to receive a fourth liquid comprising an elution solution; (iii) a first transport component 821 configured to interact with the plurality of particles, thereby directing the plurality of particles to the fourth liquid in the at least one channel; (iv) a first outlet 831 and a second outlet 834 each in fluid communication with the at least one channel, wherein the first outlet 831 is configured to receive the fourth liquid and the plurality of particles exiting the first separation module and the second outlet 834 is configured to receive remaining liquid. The purification device 800 further comprises an elution module 803, e.g., a third gyroid module (e.g., a SG, DG e.g., CDG module), downstream of the first separation module 802. The elution module 803 comprises a third network of a third plurality of gyroids, e.g., SGs or DGs (e.g., CDGs) configured to provide a third plurality of microchannels, wherein the third plurality of microchannels are fluidically interconnected and in fluid communication with the first outlet 831. The elution module 803 can further comprise an additional port 813 configured to receive an additional liquid comprising an elution solution. The purification device 800 further comprises a second separation module 804 downstream of the elution module 803. The second separation module 804 comprises (i) at least one channel in fluid communication with the elution module; (ii) a fifth port 814 configured to receive a fifth liquid comprising a re-equilibration solution; (iii) a third outlet 833 and a fourth outlet 832 each in fluid communication with the at least one channel, wherein the fourth outlet 832 is configured to receive the re-equilibration solution and the plurality of particles exiting the second separation module and the third outlet 833 is configured to receive remaining liquid comprising the purified substance of interest; and (iv) a second transport component 822 configured to interact with the plurality of particles, thereby directing the plurality of particles to the re-equilibration solution. The plurality of particles exiting the second separation module can be fed into the mixing module with or without further treatment.

Figure 9:
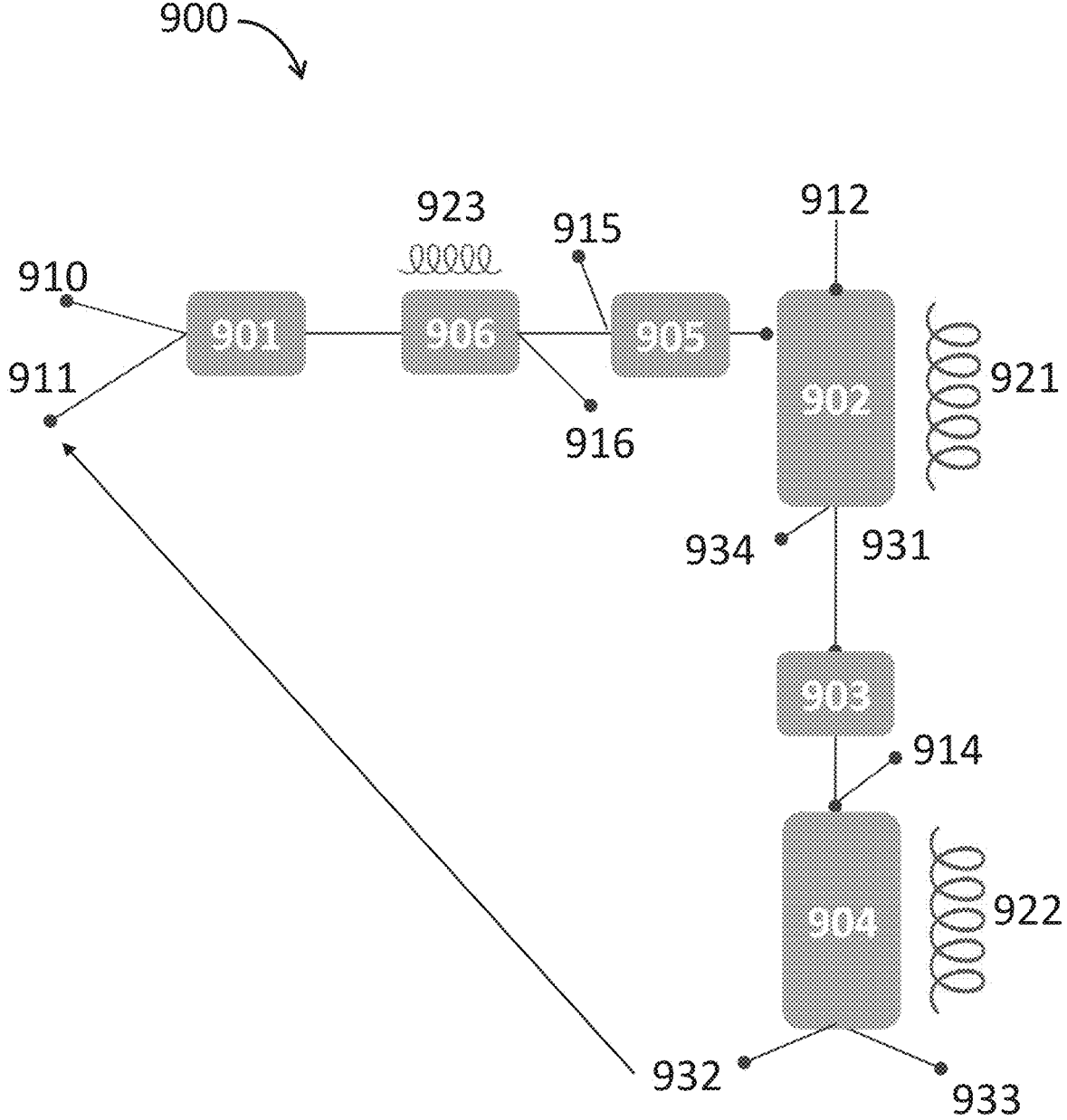
FIG. 9 shows a non-limiting example of a purification device 900.

FIG. 9 shows a non-limiting example of a purification device 900. The purification device comprises a mixing module 901, e.g., a first gyroid module (e.g., a SG, DG e.g., CDG module). The mixing module 901 comprises a first network comprising a first plurality of gyroids, e.g., SGs or DGs (e.g., CDGs) configured to provide a first plurality of microchannels, wherein the first plurality of microchannels are fluidically interconnected. The purification device 900 comprises a first port 910 and a second port 911. The first port 910 is configured to receive a first liquid comprising a substance of interest. The second port 911 is configured to receive a second liquid comprising a plurality of particles, wherein the plurality of particles comprises a binding agent. The first port and second port are in fluid communication with an inlet of each of the first layer of the first plurality of gyroids, e.g., SGs or DGs (e.g., CDGs). In some embodiments, the first port comprises a first plurality of sub-ports subdivided dichotomously from the first port and each sub-port of the first plurality of sub-ports is connected with an inlet of the first layer of the first plurality of gyroids, e.g., SGs or DGs (e.g., CDGs). In some embodiments, the second port comprises a second plurality of sub-ports subdivided dichotomously from the second port and each sub-port of the second plurality of sub-ports is connected with an inlet of the first layer of the first plurality of gyroids, e.g., SGs or DGs (e.g., CDGs). The purification device 900 further comprises a separation module 906 (the third separation module as disclosed herein) downstream of the mixing module 901. The separation module 906 comprises (i) at least one channel in fluid communication with the mixing module 901; (ii) a transport component 923 (the third transport component as disclosed herein) configured to interact with the plurality of particles, thereby separating and directing the plurality of particles to a downstream module; and (iii) an outlet 916 configured to receive a waste stream. The purification device 900 further comprises a wash module 905, e.g., a second gyroid module (e.g., a SG, DG e.g., CDG module), downstream of the separation module 906 to receive the plurality of particles. The wash module 905 comprises a second network comprising a second plurality of gyroids, e.g., SGs or DGs (e.g., CDGs) in fluid communication with the separation module 906 and configured to provide a second plurality of microchannels, wherein the second plurality of microchannels are fluidically interconnected. The wash module may comprise a third port 915 configured to receive a liquid comprising a wash solution. The purification device 900 further comprises a first separation module 902 downstream of the wash module 905. The first separation module 902 comprises (i) at least one channel in fluid communication with the wash module, (ii) a fourth port 912 configured to receive a fourth liquid comprising an elution solution; (iii) a first transport component 921 configured to interact with the plurality of particles, thereby directing the plurality of particles to the fourth liquid in the at least one channel; (iv) a first outlet 931 and a second outlet 934 each in fluid communication with the at least one channel, wherein the first outlet 931 is configured to receive the fourth liquid and the plurality of particles exiting the first separation module and the second outlet 934 is configured to receive remaining liquid. The purification device 900 further comprises an elution module 903, e.g., a third gyroid module (e.g., a SG, DG e.g., CDG module), downstream of the first separation module 902. The elution module 903 comprises a third network of a third plurality of gyroids, e.g., SGs or DGs (e.g., CDGs) configured to provide a third plurality of microchannels, wherein the third plurality of microchannels are fluidically interconnected and in fluid communication with the first outlet 931. The purification device 900 further comprises a second separation module 904 downstream of the elution module 903. The second separation module 904 comprises (i) at least one channel in fluid communication with the elution module; (ii) a fifth port 914 configured to receive a fifth liquid comprising a re-equilibration solution; (iii) a third outlet 933 and a fourth outlet 932 each in fluid communication with the at least one channel, wherein the fourth outlet 932 is configured to receive the re-equilibration solution and the plurality of particles exiting the second separation module and the third outlet 933 is configured to receive remaining liquid comprising the purified substance of interest; and (iv) a second transport component 922 configured to interact with the plurality of particles, thereby directing the plurality of particles to the re-equilibration solution. The plurality of particles exiting the second separation module can be fed into the mixing module with or without further treatment.

Figure 10:
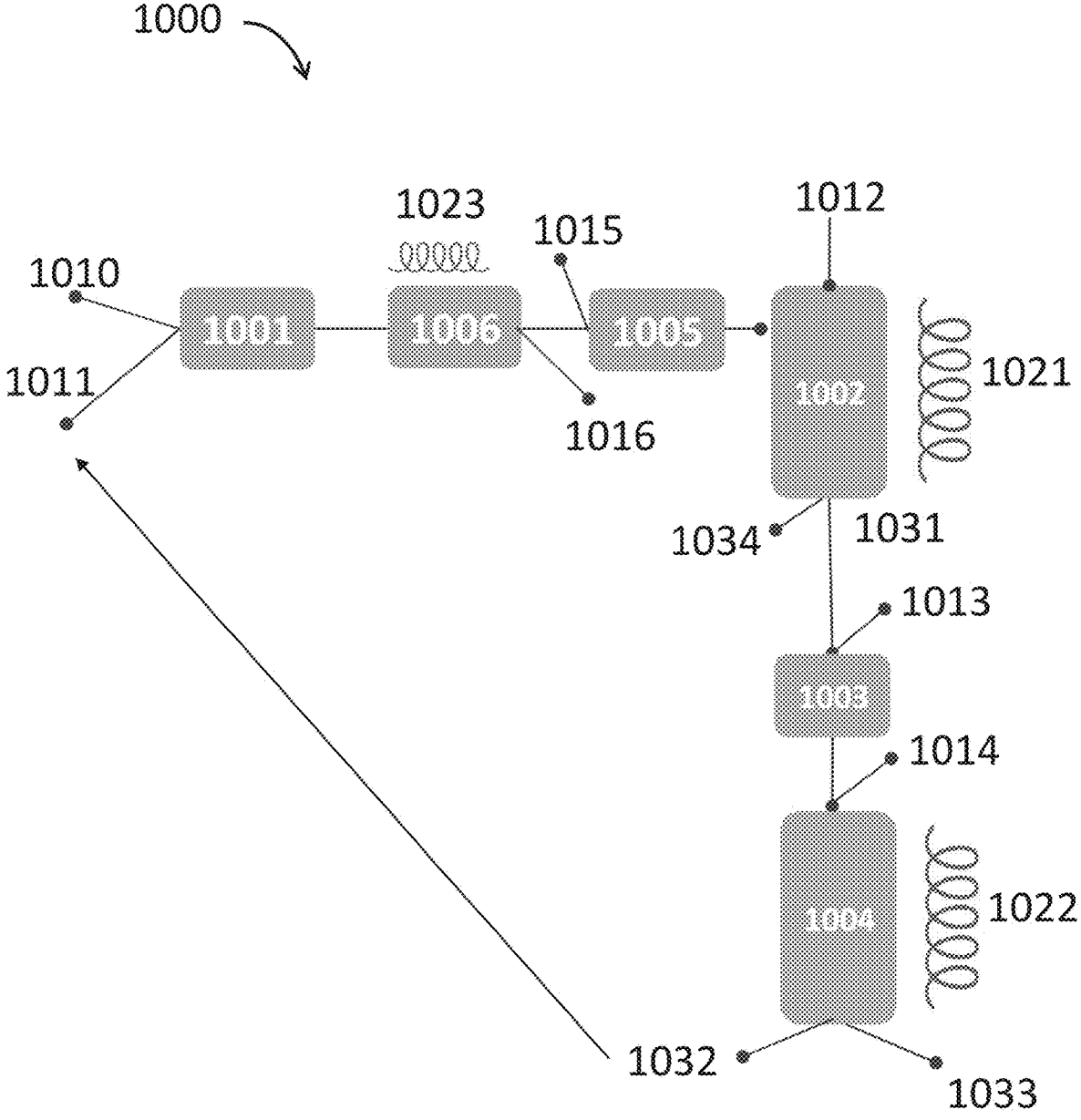
FIG. 10 shows a non-limiting example of a purification device 1000.

FIG. 10 shows a non-limiting example of a purification device 1000. The purification device comprises a mixing module 1001, e.g., a first gyroid module (e.g., a SG, DG e.g., CDG module). The mixing module 1001 comprises a first network comprising a first plurality of gyroids, e.g., SGs or DGs (e.g., CDGs) configured to provide a first plurality of microchannels, wherein the first plurality of microchannels are fluidically interconnected. The purification device 1000 comprises a first port 1010 and a second port 1011. The first port 1010 is configured to receive a first liquid comprising a substance of interest. The second port 1011 is configured to receive a second liquid comprising a plurality of particles, wherein the plurality of particles comprises a binding agent. The first port and second port are in fluid communication with an inlet of each of the first layer of the first plurality of gyroids, e.g., SGs or DGs (e.g., CDGs). In some embodiments, the first port comprises a first plurality of sub-ports subdivided dichotomously from the first port and each sub-port of the first plurality of sub-ports is connected with an inlet of the first layer of the first plurality of gyroids, e.g., SGs or DGs (e.g., CDGs). In some embodiments, the second port comprises a second plurality of sub-ports subdivided dichotomously from the second port and each sub-port of the second plurality of sub-ports is connected with an inlet of the first layer of the first plurality of gyroids, e.g., SGs or DGs (e.g., CDGs). The purification device 1000 further comprises a separation module 1006 (the third separation module as disclosed herein) downstream of the mixing module 1001. The separation module 1006 comprises (i) at least one channel in fluid communication with the mixing module 1001; (ii) a transport component 1023 (the third transport component as disclosed herein) configured to interact with the plurality of particles, thereby separating and directing the plurality of particles to a downstream module; and (iii) an outlet 1016 configured to receive a waste stream. The purification device 1000 further comprises a wash module 1005, e.g., a second gyroid module (e.g., a SG, DG e.g., CDG module), downstream of the separation module 1006 to receive the plurality of particles. The wash module 1005 comprises a second network comprising a second plurality of gyroids, e.g., SGs or DGs (e.g., CDGs) in fluid communication with the separation module 1006 and configured to provide a second plurality of microchannels, wherein the second plurality of microchannels are fluidically interconnected. The wash module may comprise a third port 1015 configured to receive a liquid comprising a wash solution. The purification device 1000 further comprises a first separation module 1002 downstream of the wash module 1005. The first separation module 1002 comprises (i) at least one channel in fluid communication with the wash module, (ii) a fourth port 1012 configured to receive a fourth liquid comprising an elution solution; (iii) a first transport component 1021 configured to interact with the plurality of particles, thereby directing the plurality of particles to the fourth liquid in the at least one channel; (iv) a first outlet 1031 and a second outlet 1034 each in fluid communication with the at least one channel, wherein the first outlet 1031 is configured to receive the fourth liquid and the plurality of particles exiting the first separation module and the second outlet 1034 is configured to receive remaining liquid. The purification device 1000 further comprises an elution module 1003, e.g., a third gyroid module (e.g., a SG, DG e.g., CDG module), downstream of the first separation module 1002. The elution module 1003 comprises a third network of a third plurality of gyroids, e.g., SGs or DGs (e.g., CDGs) configured to provide a third plurality of microchannels, wherein the third plurality of microchannels are fluidically interconnected and in fluid communication with the first outlet 1031. The elution module 1003 can further comprise an additional port 1013 configured to receive an additional liquid comprising an elution solution. The purification device 1000 further comprises a second separation module 1004 downstream of the elution module 1003. The second separation module 1004 comprises (i) at least one channel in fluid communication with the elution module; (ii) a fifth port 1014 configured to receive a fifth liquid comprising a re-equilibration solution; (iii) a third outlet 1033 and a fourth outlet 1032 each in fluid communication with the at least one channel, wherein the fourth outlet 1032 is configured to receive the re-equilibration solution and the plurality of particles exiting the second separation module and the third outlet 1033 is configured to receive remaining liquid comprising the purified substance of interest; and (iv) a second transport component 1022 configured to interact with the plurality of particles, thereby directing the plurality of particles to the re-equilibration solution. The plurality of particles exiting the second separation module can be fed into the mixing module with or without further treatment.

In some embodiments, the gyroids comprised in the mixing module have a constant cross section. In some embodiments, the gyroids comprised in the wash module have a constant cross section. In some embodiments, the gyroids comprised in the elution module have a constant cross section.

In some embodiments, the gyroids are double gyroids. In some embodiments, the double gyroids have constant cross-section area. In some embodiments, the double gyroids are constant double gyroids (CDG). In some embodiments, the distance traveled by the fluids through the CDG module is determined by:

$$D = \frac{\left( \frac{Q_i + Q_{ii}}{\pi d^2/4} \right) * T_{res} * f_{cor}}{n}$$

wherein:

D is distance traveled by the fluids;

$Q_i$ is flow rate of the liquid i;

$Q_{ii}$ is flow rate of the liquid ii;

d is the diameter of the microchannels;

$T_{res}$ is a residence time;

$f_{cor}$ is a correlation factor; and n is number of gyroids.

In some embodiments, the plurality of microchannels in the mixing module, the wash module and/or the elution module have different diameters and length. In some embodiments, the diameter of one or more of the modules is from about 25 mm to about 3000 mm. In some embodiments, the length of one or more of the modules is from about 5 cm to about 200 cm.

In some embodiments, the plurality of microchannels in the mixing module, the wash module and/or the elution module are configured to ensure a laminar flow inside the microchannels.

In some embodiments, liquid entering into a module is distributed to microchannels of the module through a port that is subdivided dichotomously at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, or more times to a plurality of sub-ports and each sub-port of the plurality of sub-ports is connected with an inlet of a microchannel of the first layer of a plurality of gyroids, e.g., SGs or DGs (e.g., CDGs), of the module. For example, in FIGS. 5-10, liquid entering mixing module (501, 601, 701, 801, 901, and/or 1001), wash module (505, 605, 705, 805, 905, and/or 1005) and/or elution module (503, 603, 703, 803, 903, and/or 1003) is distributed to microchannels of the module through a port that is subdivided dichotomously, such that each sub-port of the plurality of sub-ports is connected with an inlet of a microchannel of the first layer of a plurality of gyroids in the module, and similarly, liquid entering through ports 515, 615, 915, 1015, 613, 813, and/or 1013, is distributed to microchannels of the module through a port that is subdivided dichotomously, such that each sub-port of the plurality of sub-ports is connected with an inlet of a microchannel of the first layer of a plurality of gyroids in the module.

In some embodiments, the plurality of the gyroids of the last layer of the mixing module, washing module and/or elution module are configured so that they merge at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, or more times to form at least one exit port from the module. For example, in FIGS. 5-10, the plurality of the gyroids of the last layer of 501, 601, 701, 801, 901, and/or 1001 merge to form a single exit port from the mixing module; the plurality of the gyroids of the last layer of 505, 605, 705, 805, 905, and/or 1005 merge to form a single exit port from the wash module; the plurality of the gyroids of the last layer of 503, 603, 703, 803, 903, and/or 1003 merge to form a single exit port from the elution module.

In some embodiments, the first transport component, the second transport component, and the third transport component each comprise an electromagnetic field, an acoustic fluidic field, or a magnetic field.

In some embodiments, the electromagnetic field, acoustic fluidic field, or magnetic field of the first transport component is positioned laterally with respect to the at least one channel of the first separation module. In some embodiments, the electromagnetic field, acoustic fluidic field, or magnetic field of the first transport component can be positioned at any angle or orientation with respect to the at least one channel of the first separation module. In some embodiments, the electromagnetic field, acoustic fluidic field, or magnetic field is comprised of one or more than one magnet, coil or other component positioned in reference to the at least one channel of the first separation module.

In some embodiments, the electromagnetic field, acoustic fluidic field, or magnetic field of the second transport component is positioned laterally with respect to the at least one channel of the second separation module. In some embodiments, the electromagnetic field, acoustic fluidic field, or magnetic field of the second transport component can be positioned at any angle or orientation with respect to the at least one channel of the second separation module. In some embodiments, the electromagnetic field, acoustic fluidic field, or magnetic field is comprised of one or more than one magnet, coil or other component positioned in reference to the at least one channel of the second separation module.

In some embodiments, the electromagnetic field, acoustic fluidic field, or magnetic field of the transport component (e.g., the third transport component) is positioned laterally with respect to the at least one channel of the third separation module. In some embodiments, the electromagnetic field, acoustic fluidic field, or magnetic field of the third transport component can be positioned at any angle or orientation with respect to the at least one channel of the third separation module. In some embodiments, the electromagnetic field, acoustic fluidic field, or magnetic field is comprised of one or more than one magnet, coil or other component positioned in reference to the at least one channel of the third separation module.

In some embodiments, the purification device (e.g., 500, 600, 700, 800, 900, or 1000) comprises a recycling line configured to redirect the particles from the third outlet of the second separation module to the mixing module.

In some embodiments, the at least one channel of the separation module is configured to not allow mixing of incoming two streams of liquid. In some embodiments, the at least one channel of the first separation module is configured to not allow mixing of incoming two streams of liquid. The incoming two streams of liquid comprises the elution solution and a solution from the wash module. In some embodiments, the at least one channel of the second separation module is configured to not allow mixing of incoming two streams of liquid. The incoming two streams of liquid comprises the re-equilibrium solution and a solution from the elution module.

The purification device may include one or more sensors and/or one or more sample collection devices. The sensors and/or sample collection devices may be used to monitor the concentration of the substance of interest in the modules. In some embodiments, one or more sensors are in-line sensors. In some embodiments, the sensors are off-line and receive a sampling from any one of the modules. The sensor can measure a biological, physical and/or chemical parameter. Example parameters include pH, substance concentration, temperature, and/or optical density.

In some embodiments, the system or module is in communication with a camera device. The camera monitors the output of at least one module. The camera may capture a biochemical, physical or chemical feature of the module output. In some embodiments, the camera is an inverse spectral camera which captures information across a range of wavelengths. In some embodiments, the camera device captures information from the output of two or more modules.

The purification device may further comprise one or more controllers. The controllers may control the flow rate and/or mixing parameters in one or more modules of the purification device. In some embodiments, the controller is in communication with and/or receives information from one or more sensors. The controller may make changes to the flow rate and/or mixing parameters in response to the information from the one of more sensors.

In some embodiments, the system includes a purification device is suitable for scaled-up purification of biological products that are produced and used as the input material for the purification device. In some instances, the overall size of the purification device and the modules within is scaled-up to accommodate the larger volume and amounts of sample (containing the substance of interest) that is applied to the purification device. In some embodiments, multiple purification devices are run in parallel to accommodate the larger volume and amounts of sample.

Assembly of Minimodules

The purification device described herein provides a 3-D structure comprised multiple modules, with one or more modules comprising minimodules. The purification device may include greater than or equal to 1, 2, 3, 4, 5, 6, 7, 8, 9, 10, or more modules comprised of minimodules. In some embodiments, the minimodules create a series of channels and/or chambers for the movement of biological products and particles, contact and mixing between biological products and particles, separation of biological products and particles, and for the flow of liquid. The minimodules can include shapes such as single gyroid, modified single gyroid, double gyroid, modified double gyroid, or any shape that may be described as a triply periodic minimal surface (TPMS). This type of surface forms a lattice system that can grow on all three axes (X, Y, Z) periodically. TPMS may be free of self-intersections and divide a given volume into two (or more) independent sub volumes. A self-intersection may comprise a surface with a single normal vector per point defining the surface. If the surface divides the volume in which it is circumscribed into two independent and congruent sub volumes, this surface is called a balanced surface. TPMS are described in terms of a fundamental patch or asymmetric unit from which the entire surface may be built up by its symmetry elements. The minimodules may be fluidically connected (e.g., interconnected) with one another such that liquid, biological products, and/or particles can flow from one minimodule to another minimodule.

One advantage of gyroids is the mitigation of gravitational forces that may, in other structures, provide an uneven exposure to liquid and/or particles. The shape creates a three-dimensional (3-D) laminar forces such that the variation in distance of any one particle to a structural wall is averaged out to provide a more constant and even exposure among the particle population. Additionally, the gyroids shape avoids stagnant areas of liquid and/or particles, where flow may not occur or may be interrupted. This allows for the use of higher throughput through the module and through the purification device with lower velocities and results in lower sheering stress on the particles and/or biological products. In some embodiments, the average velocity is from about 1 microns/second to about 5000 microns/second. In some embodiments, the average velocity can be greater than or equal to about 1 microns/second, 5 microns/second, 10 microns/second, 15 microns/second, 20 microns/second, 50 microns/second, 100 microns/second, 200 microns/second, 5000 microns/second, or more. In some embodiments, the velocity of the liquid flowing through the channel within a gyroid is greater than the free fall velocity of particles flowing through the same channel. In some embodiments, the SG or DG reduces and/or enables a more efficient volume occupation.

The gyroids structure provides increased surface area over many shape options, and this increased surface area provides improvements in liquid flow, mixing and interaction between the liquid and particles.

The minimodule SG or DG structures are fitted together into modules or microchannels. The structure and number of minimodules can be tailored to mixing and separation efficiency as well as to regulate the velocities of liquid, particles, interaction between liquid and particles.

Particles

In some embodiments, the particles can comprise microparticles. In some embodiments, the particles can comprise nanoparticles. In some embodiments, the particles comprise beads. In some embodiments, the particles can comprise any suitable shapes, e.g., nanorods, nanospheres, nanocubes, nanowires, nanofibers and/or nanotubes. In some embodiments, the particles can comprise a metal or a metal alloy. In some embodiments, the particles can be magnetic or are attracted or attractable by a magnetic field. The particles can comprise a magnetic core, e.g., a magnetic metal or metal oxide core. In some embodiments, the particles can comprise paramagnetic particles. In some embodiments, the particles can comprise particles with a metallic coating, such as coating with a noble metal. In some embodiments, the particles can comprise superparamagnetic or ferromagnetic particles.

In some embodiments, the particles can comprise a core or support. In some embodiments, the core or support can be a magnetic, paramagnetic, ferromagnetic, or superparamagnetic material. Non-limiting examples of paramagnetic or superparamagnetic material can comprise iron oxide, ferromagnetic iron oxide (e.g., $Fe_2O_3$, $Fe_3O_4$, or maghemite), or combinations thereof. In some embodiments, the core or support can comprise ceramic, glass, latex, silica, metal, alloy, polymers, or combinations thereof.

In some embodiments, the particles can comprise an organic polymer or an oligomer that is coated or coupled to the particles. In some embodiments, the organic polymer can comprise a random polymer or a copolymer (e.g., a block copolymer). In some embodiments, the organic polymer can be crosslinked. In some embodiments, the organic polymer or oligomer can be hydrophobic. In some embodiments, the organic polymer or oligomer can be hydrophilic. In some embodiments, the organic polymer or oligomer can be amphiphilic. In some embodiments, the organic polymer or oligomer can comprise a positive or negative charge. In some embodiments, the organic polymer or oligomer can comprise be selected from the group consisting of, but not limited to, polystyrene or derivative, poly(divinylbenzene), poly(styrene-acrylate), styrene-butadiene copolymer, styrene-divinylbenzene copolymer, poly(styrene-oxyethylene), polymethyl methacrylate, polymethacrylate, polyurethane, polyglutaraldehyde, polyethylene imine, polyvinylpyrrolidone, poly(vinyl alcohol), poly(acrylic acid), poly(N,N'-methylene bis-acrylamide), polyolefins, e.g., polyethylene or polypropylene, polyvinylchloride, polyacrylonitrile, polysulfone, poly(ether sulfone), silicones, silica or derivatives (e.g., 3-aminopropyl triethoxysilane, tetraethyl orthosilicate), methylol melamine, a biodegradable polymer (e.g., dextran or poly(ethylene glycol)-dextran (PEG-DEX)), polysaccharides, polypeptide, chitosan, ion exchange resin, or combinations thereof.

In some embodiments, the binding agent can be covalently or non-covalently bound to the particles. In some embodiments, the surface of the particle can comprise functional groups or a plurality of functional groups for covalent attachment (coupling, conjugation, or binding) of a binding agent. The covalent binding can comprise any suitable binding chemistries (e.g., through carbon-carbon, carbon-oxygen, carbon-nitrogen, carbon-sulfur, or carbon-phosphorus bond). In some embodiments, the covalent binding can comprise attachment through one or more functional groups selected from the group consisting of carboxyl, carbonyl, alkoxy, hydroxyl, tosyl, epoxy, aldehyde, amine, amide, amino, sulfonate, hydrazide, isothiocyanate, maleimide, sulfhydryl, or a combination thereof. In some embodiments, the binding agent can be bound to the particles with an amine reactive reagent, e.g., sulfosuccinimidyl 6-(biotinamido) hexanoate (sulfo-NHS-LC-biotin) or succinimidyl-6-(biotinamido)hexanoate (NHS-LC-biotin).

In some embodiments, the binding agent can be bound/coated to the particles by a cleavable bond. In some embodiments, the cleavable bond can be a disulfide bond (R—S—S—R) or a diselenide bond (R—Se—Se—R).

Non-covalent binding can comprise affinity, ionic, van der Waals (e.g., dipole/dipole or London forces), hydrogen bonding (e.g., between nucleotides, amino acids, polynucleotide duplexes, polypeptides), or hydrophobic interactions. In some embodiments, the non-covalent binding can be specific. In some embodiments, the non-covalent binding can be non-specific. In some embodiments, specific non-covalent binding can comprise a binding interaction between biotin or a biotinylated molecule and a biotin-binding molecule such as avidin or a fragment thereof, captavidin or a fragment thereof, streptavidin or a fragment thereof, neutravidin or a fragment thereof, or combinations thereof. In some embodiments, the biotin or biotinylated molecule can comprise a biotinylated Fab, a biotinylated immunoglobulin or fragment thereof, a biotinylated small molecule (e.g., a hormone or a ligand of a receptor), a biotinylated polynucleotide, a biotinylated macromolecule (e.g., a protein or a natural or synthetic polymer). In some embodiments, the non-covalent binding can comprise a binding interaction between a substrate and its enzyme. In some embodiments, the non-covalent binding can comprise a binding of a glycoprotein to a lectin specific for the glycoprotein. In some embodiments, the non-covalent binding can comprise a binding of a ligand to a receptor specific for the ligand. In some embodiments, the non-covalent binding can comprise a binding of an antibody or antigen binding fragment to an antigen. In some embodiments, the non-covalent binding can comprise a duplex formation between a polynucleotide and a complementary or substantially complementary polynucleotide.

Liquid Supply

In some embodiments, the liquid comprising the substance of interest can be supplied from a reactor, processor, bioreactor or bioprocessor. In some embodiments, the purification device is directly connected to the reactor, processor, bioreactor or bioprocessor. A bioreactor or bioprocessor can comprise any one of bioreactors or bioprocessors disclosed in WO2020076852, titled "CONTINUOUS FLOW MICROBIOREACTOR", the disclosure of which is incorporated herein by reference.

In some embodiments, the system includes one or more components to supply liquid, e.g., first liquid, second liquid, wash solution, elution solution, and/or re-equilibrium solution, to the one or more modules. Components can include one or more of an electroporator or other sterilization device, a reservoir, a pump, a bubble sensor and a bubble trap.

The system can also include one or more reservoirs for holding the liquid before supplying it to a module. In some embodiments, the system includes at least 1, at least 2, at least 3, at least 4, at least 5, at least 6, at least 7, at least 8, at least 9, at least 10, or more reservoirs. The reservoirs can be filled asynchronously, so that one reservoir fills while another, already fully filled, is used to supply the one or more modules with liquid. The reservoir being filled has any exposure to electrical current that may flow from upstream components such as the electroporator. The filled reservoir is isolated from electrical current flow such that it cannot transmit current to downstream components and modules. In some embodiments, the volume of the reservoir may be linked to throughput of the purification device. In some embodiments, multiple reservoirs may be installed in parallel and uncoupled from each other. In some embodiments, multiple reservoirs may be installed in series.

The liquid supply components can also include one or more sensors. The sensors can measure parameters including pH and temperature of the liquid. A sensor may be an in-line sensor or may be connected to a sampling device that samples liquid intermittently from one or more components of the liquid supply. The supply system can provide liquid at a range of rates dependent on the use, scale and operation of the system. In some embodiments, the liquid supply can provide from about 10 microliters to about 1000 liters per hour to one or more of the downstream modules. In some embodiments, the liquid media supply provides from about 0.5 liter to 1000 liters per hour to one or more of the downstream modules. In some embodiments, the liquid supply provides from about 0.5 liter to 5 liters per hour to one or more of the downstream modules. In some embodiments, the liquid supply provides from about 10 liters to 80 liters per hour to one or more of the downstream modules. In some embodiments, the liquid supply provides form about 100 liters to 1000 liters per hour to one or more of the downstream modules.

The liquid supply components may include one or more pumps for flowing liquid from a reservoir to a downstream module. The system may include greater than or equal to 1, greater than or equal to 2, greater than or equal to 3, greater than or equal to 4, greater than or equal to 6, greater than or equal to 8, greater than or equal to 10, or more pumps. The pumps may be the same type of pump or may be different types of pumps. Example pumps include a syringe pump, a peristaltic pump, and a pressure pump. The liquid media supply system is configured to provide unidirectional flow through to the downstream component. The pumps may work synchronously or individually. The one or more pumps supply liquid with a high degree volume and rate accuracy to the downstream modules. In some embodiments, the accuracy is within 1, 2, 3, 4 or 5 nanoliters.

Methods of Use

In some embodiments herein, one or more modules is utilized to purify biological products (i.e., substances of interest). The biological products may be comprised in a mixture for example, a mixture of substances produced by a biological organism. The mixture may be derived from cells, such as cells grown by fermentation or other growth chambers or media. The mixture can be systems using cellular machinery. The mixture may contain growth media, or components from growth media, other cellular substances (e.g., proteins, nucleic acids, small and large molecules, lipids, metabolites). A substance of interest may be produced in vitro, such as by an in vitro synthesis method and the mixture applied to the purification device may include components from the in vitro system, in addition to the substance of interest. In some instances, the substance of interest may be partially purified prior to its input into purification device, for example by precipitation, chromatographic separation, filtration, centrifugation, deterministic lateral displacement (DLD) or other purification steps. In some embodiments, the liquid comprising the substance of interest, i.e., a sample, comes from a bioreactor or bioprocessor. In some embodiments, the liquid comprising the substance of interest can be pretreated before directing to the purification device. Pre-treatment can comprise modifying a chemical or physical properties of the sample. In some embodiments, the chemical or physical property can comprise temperature, pH, salinity, conductivity, density, viscosity, surface tension, or protein content. In some embodiments, the pre-treatment can comprise introducing to the sample chemicals to release the substance of interest from the matrix or to remove interfering elements. In some embodiments, the pre-treatment can comprise a filtration process, precipitation, chromatographic separation, DLD or other purification steps to remove at least a portion of particulates or cells.

The substance of interest may be comprised in a liquid. The substance of interest may be comprised in a solid or semi-solid form that is then resuspended, dissolved or otherwise converted to a liquid form before inputting into the purification device described herein.

The method of purifying biological products can comprise contacting a liquid comprising a substance of interest with particles such that the particles capture the substance of interest, separating the particles from the liquid; and eluting the captured substance of interest off the particles, thereby generating a purified substance of interest.

In some embodiments, a method of purifying biological products can comprise: providing a purification device; flowing a first liquid comprising a substance of interest to the purification device; and flowing a second liquid comprising a plurality of particles to the purification device.

In some embodiments, a method of purification of a substance of interest can comprise: a) directing a first liquid comprising the substance of interest into a mixing module of a purification device; b) directing a second liquid comprising a plurality of particles into the mixing module of the purification device; c) flowing the first liquid and the second liquid through the mixing module, wherein the first liquid and second liquid are mixed in the mixing module; d) separating the plurality of particles from the first liquid and the second liquid; e) eluting the substance of interest off the plurality of particles; thereby generating purified substance of interest. In some embodiments, the purification device can comprise any purification device as disclosed in the present disclosure, for example, purification device 500, 600, 700, 800, 900, or 1000.

In some embodiments, the method can further comprise collecting the purified biological products from the purification device. In some embodiments, the method can further comprise recycling the particles. In some embodiments, the method can further comprise reusing the particles.

In some embodiments, the liquid comprising the substance of interest, i.e., a sample, comes from a reactor, processor, bio-reactor or bio-processor. In some embodiments, the liquid comprising the substance of interest can be pretreated before directing to the purification device. Pretreatment can comprise modifying a chemical or physical properties of the sample. In some embodiments, the chemical or physical property can comprise temperature, pH, salinity, conductivity, density, viscosity, surface tension, or protein content. In some embodiments, the pre-treatment can comprise introducing to the sample chemicals to release the substance of interest from the matrix or to remove interfering elements. In some embodiments, the pre-treatment can comprise a filtration process to remove at least a portion of particulates or cells.

In some embodiments, a flow rate of the first liquid is higher than a flow rate of the second liquid. In some embodiments, a flow rate ratio of the first liquid to the second liquid is from 2:1 to 8:1. In some embodiments, a flow rate ratio of the first liquid to the second liquid is from 3:1 to 4:1. In some embodiments, a flow rate of the second liquid is higher than a flow rate of the first liquid. In some embodiments, a flow rate ratio of the first liquid to the second liquid is from 1:2 to 1:8. In some embodiments, a flow rate ratio of the first liquid to the second liquid is from 1:3 to 1:4. In some embodiments, a flow rate of the first liquid is equal to a flow rate of the second liquid.

In some embodiments, a flow in the plurality of gyroids or in the purification device is substantially a laminar flow. In some embodiments, a flow in the plurality of gyroids or in the purification device is a turbulent flow.

In some embodiments, a residence time of the liquid inside the mixing module is determined by the affinity constants of the substance of interest and binding agent present on the plurality of particles, the homogeneity of the mixture (e.g., the amount of substance of interest within the starting sample inputted into the purification device), a size of the mixing module (e.g., number of gyroids, length, diameter), and the flow rate of the liquids. In some embodiments, the residence time is from about 1 sec to about 1 min, from about 1 sec to about 5 min, from about 1 sec to about 10 min, from about 1 sec to about 20 min, from about 1 sec to about 30 min, from about 1 sec to about 40 min, from about 1 sec to about 50 min, from about 1 sec to about 60 min, from about 1 sec to about 2 hr, from about 1 sec to about 5 hr, from about 1 sec to about 10 hr, from about 1 sec to about 15 hr, from about 1 sec to about 20 hr, from about 1 sec to about 24 hr, from about 1 min to about 5 min, from about 1 min to about 10 min, from about 1 min to about 20 min, from about 1 min to about 30 min, from about 1 min to about 40 min, from about 1 min to about 50 min, from about 1 min to about 60 min, from about 1 min to 2 hr, from about 1 min to about 5 hr, from about 1 min to about 10 hr, from about 1 min to about 15 hr, from about 1 min to about 20 hr, from about 1 min to about 24 hr, from about 5 min to about 10 min, from about 5 min to about 20 min, from about 5 min to about 30 min, from about 5 min to 40 min, from about 5 min to about 50 min, from about 5 min to about 60 min, from about 5 min to 2 hr, from about 5 min to about 5 hr, from about 5 min to about 10 hr, from about 5 min to about 15 hr, from about 5 min to about 20 hr, from about 5 min to about 24 hr, from about 10 min to 20 min, from about 10 min to about 30 min, from about 10 min to about 40 min, from about 10 min to about 50 min, from about 10 min to about 60 min, from about 10 min to 2 hr, from about 10 min to about 5 hr, from about 10 min to about 10 hr, from about 10 min to about 15 hr, from about 10 min to about 20 hr, from about 10 min to about 24 hr, from about 20 min to about 30 min, from about 20 min to about 40 min, from about 20 min to about 50 min, from about 20 min to about 60 min, from about 20 min to 2 hr, from about 20 min to about 5 hr, from about 20 min to about 10 hr, from about 20 min to about 15 hr, from about 20 min to about 20 hr, or from about 20 min to about 24 hr.

Methods for Constructing Purification Devices

The systems, components and modules herein can be fabricated from a variety of materials and such materials can be tailored depending on the substance of interest. In some embodiments, components and modules or parts thereof are fabricated by three-dimensional (3-D) printing.

Devices and systems of the present disclosure may be formed by 3-D printing, such as, for example, stereolithography or vat polymerization. In some examples, a computer-aided manufacturing (CAM) or computer-aided design (CAD) model of a device of the present disclosure is provided to a 3-D printing system that employs stereolithography, comprising providing a container having a resin comprising a photoinitiator and one or more polymer precursors. An ultra-violet (UV) laser may be used to draw a pre-programmed design or structure into the surface of the container having the resin. The resin may be a photopolymer that photochemically solidifies to form a single layer upon contact with the UV laser. Additional resin may be added and solidified in a layer-by-layer manufacturing process. Stereolithography may be used to construct modules in an additive top-down or bottom-up manufacturing approach.

Alternative approaches for constructing purification devices may include self-assembly of polymers. e.g., block co-polymers, to form 3-D gyroid structures or subtractive manufacturing methods. Subtractive manufacturing methods may include chemical or mechanical removal of sacrificial materials. For example, sacrificial materials may be formed using adhesive manufacturing with a sintering laser. The sacrificial material may be immersed, dipped, or otherwise coated in biocompatible polymers. The sacrificial material may then be dissolved or mechanically removed to form 3-D gyroid structures from the biocompatible polymers.

The printing devices may comprise stereolithographic 3D printing devices. A stereolithographic device may comprise an optical assembly. The optical assembly may be a static optical assembly. Alternatively, in some examples, the optical assembly may be a dynamic optical assembly. The device may further comprise a light engine which may be configured to project one or more beams. A beam may comprise or be a luxbeam. The beam (e.g., luxbeam) may comprise one or more pixels. The one or more pixels may comprise a plurality of pixels. The one or more pixels may be located along an axis (e.g., Z axis).

Provided herein are methods of manufacturing a multi-dimensional object such as a 2D or 3D object. In some cases, a multi-dimensional object (e.g., 3D object) may comprise one or more units. In some examples, the one or more units may comprise multiple units or a plurality of units. In some examples, the units may comprise repeating units. The method may comprise: providing a procedural modeling application. The procedural modeling application may be according to e procedural modeling application provided elsewhere herein or another procedural modeling application. The procedural modeling application may be configured to perform one or more functions. In some examples, the functions may be performed at a request of a user which may provide an input or instructions to the application. Alternatively, artificial intelligence, machine learning, or other techniques may be used to perform the one or more functions. Printer systems, such as those disclose in WO2021158529 titled "Platform, Systems, and Devices for 3D Printing" which is incorporated by reference herein, is one example.

A method of manufacturing a purification device or a module, the method comprising: providing a 3D model design of the purification device or the module comprising a plurality of microchannels; converting the 3D model design into slice files; transmitting the slice files to a stereolithographic 3D printing device; formulating a resin and feeding the resin into the stereolithographic 3D printing device; and printing layer-by-layer to generate the purification device or the module.

In some embodiments, the method further comprises creating a constructive solid geometry (CSG) tree for the 3D model design. In some embodiments, the method further comprises representing the 3D model design as signed distance function. In some embodiments, the method further comprises rendering the 3D model design by utilizing ray marching. In some embodiments, the plurality of microchannels have a gyroid configuration or a modified gyroid configuration. In some embodiments, the plurality of microchannels are arranged in a plurality of layers. In some embodiments, the resin comprises at least one photoinitiator and at least one photopolymer. In some embodiments, printing layer-by-layer comprises: printing a first layer; projecting one or more beams using an optical assembly to solidify the resin; and printing a second layer. In some embodiments, the method further comprises moving the optical assembly along the z-axis while printing layer-by-layer. In some embodiments, the optical assembly comprises a static optical assembly.

The platforms, systems, and devices (collectively "printer system") provided herein are applicable to the printing structures based in crystallographic geometry spatially distributed in a periodic manner. In an example, the printer system is employed to generate such a structure. In some examples, the crystallographic geometry may comprise or be a crystal lattice based on a unit cell. The unit cell may comprise a shape. The shape of the unit cell may be any shape, such as the shapes described elsewhere herein. In an example, the shape of the unit cell may comprise a single gyroid, a double gyroid, a modified single gyroid, or a modified double gyroid.

The printer system provided herein may also be used for the printing of modules. In some examples, the printer system is employed to generate a mixing module, wash module, and/or elution module. In some examples, the module is composed of multiple minimodules. Each minimodule may have a shape, and the mini-modules may be arranged, i.e., printed, into a macrostructure. Provided herein are also examples of such modules with various macrostructures and minimodules.

In some examples, the printer system herein may generate minimodules of a defined size, for example, such that one or more channels of a structure (e.g., the minimodule and/or minimodules joined into a macrostructure such as a CDG module) accommodate flow of a set size of objects (e.g., flow of biological molecules in a liquid and/or biological molecules complexed with particles, such as magnetic particles and other particles described herein). In some embodiments, at least one of the channels of the structure is constructed to limit number of particles flowing through the channel at any one point, for example flow of a single particle, but not multiple particles flowing together.

In some examples, printer systems may provide the capacity for a continuous printable surface with a high resolution, such as to construct modules with macrostructures comprising repeating minimodules. In some cases, a 3D structure to be constructed or manufactured may comprise parts, components, sections or units, such as sub-units or modules, which in some cases, can be assembled to make the structure or object.

In some embodiments, in the methods of the present disclosure, a space can be mathematically described by a continuous and/or ordered matrix. The matrix may comprise any number of dimensions, such as, 1, 2, 3, 4, 5, 6, 7, 8, or more. In some embodiments, a matrix may be a 3D matrix. The space may be a 3D space. In some cases, the matrix may be continuous and ordered, such as a continuous and ordered three-dimensional (3D) matrix. The matrix may delimit the available spaces where elements may be placed to functionalize the space according to the requirements of the space they occupy. This method may be implemented using a computer. Provided herein is a computer system which may be used to perform the methods of the present disclosure. In some examples, the methods may comprise computer-implemented methods, such as software, code, or a set of instructions to perform the methods described herein.

In some embodiments, the minimodules can be assembled into structures (e.g., macrostructures) providing for targeted control of liquid/particle flow and distribution in the structure.

Figures 12A, 12B:
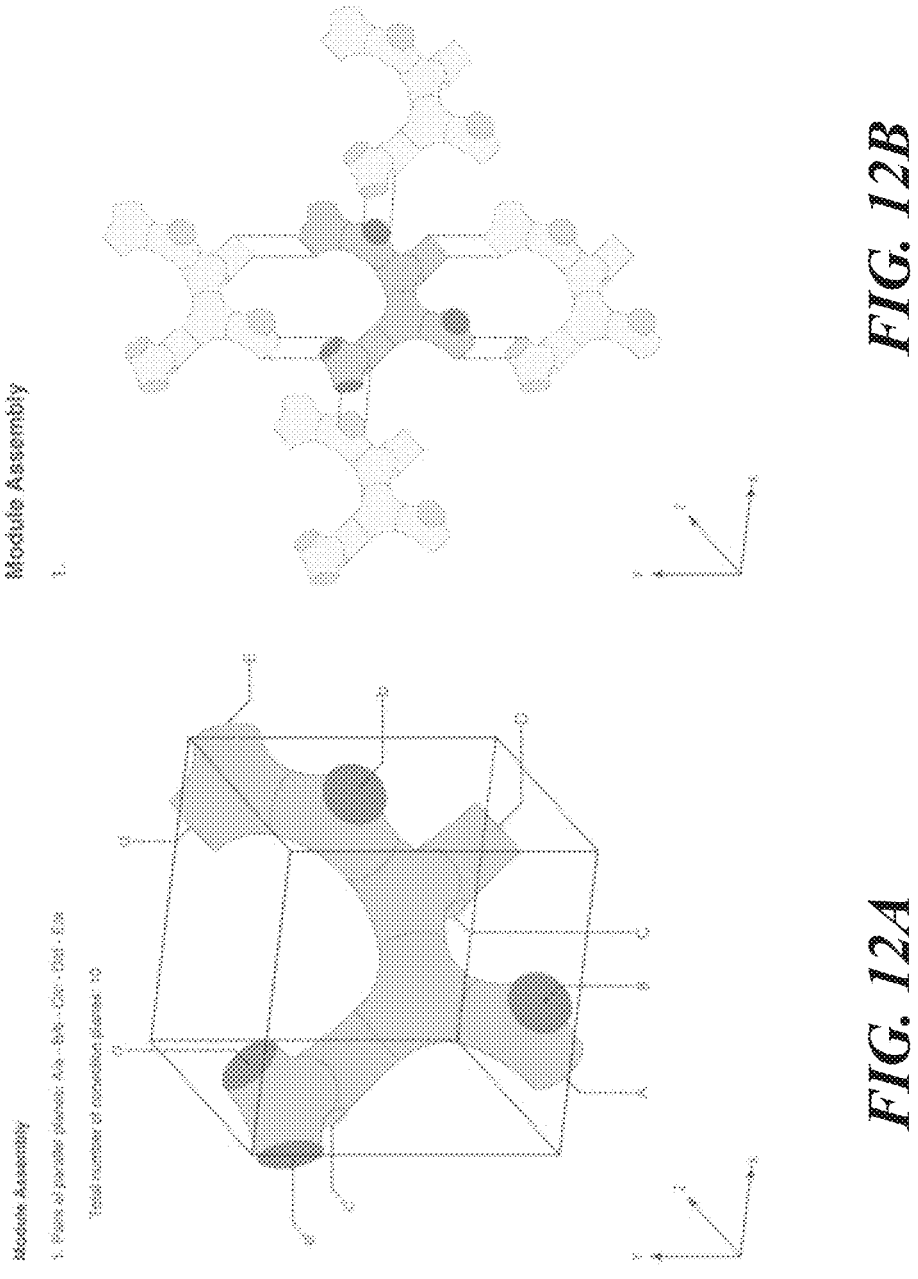
FIGS. 12A-12F illustrate minimodule assembly.
Figure 12C:
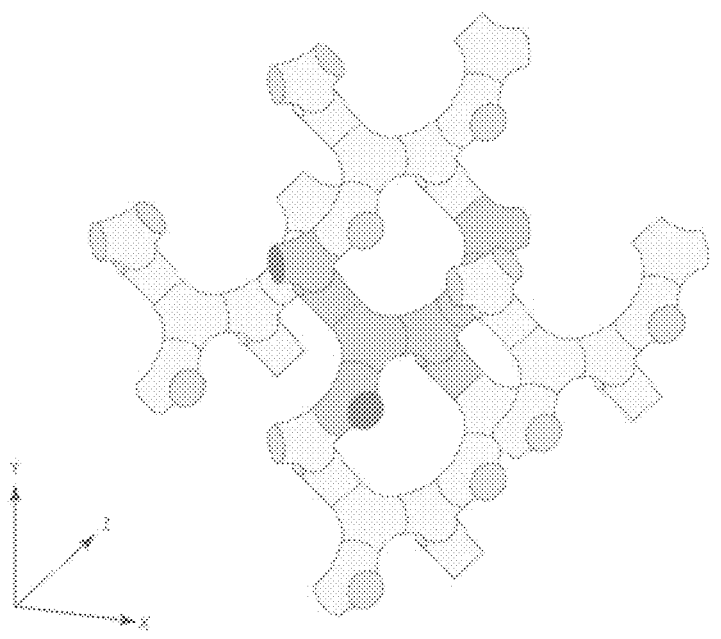

In some embodiments, the minimodules may comprise a shape or structure. The shape or structure may comprise any shape or structure provided elsewhere herein. In some embodiments, a shape or structure of a minimodule may comprise a double gyroid (DG) that may be assembled into a macrostructure to create one or more components (e.g., modules) of the purification devices provided herein. In some embodiments, a shape or structure of a minimodule may comprise a single gyroid that may be assembled into a macrostructure to create one or more components (e.g., modules) of the purification devices provided herein. FIGS. 12A-12F illustrate assembly starting with a first minimodule (e.g., a single gyroid) and assembling additional minimodules such that the geometry is repeated to form a three-dimensional (3-D) matrix. FIG. 12A shows an example of a minimodule. FIG. 12B shows an example of minimodule assembly into an example three-dimensional matrix. FIG. 12C shows an example three-dimensional matrix.

Figure 12D:
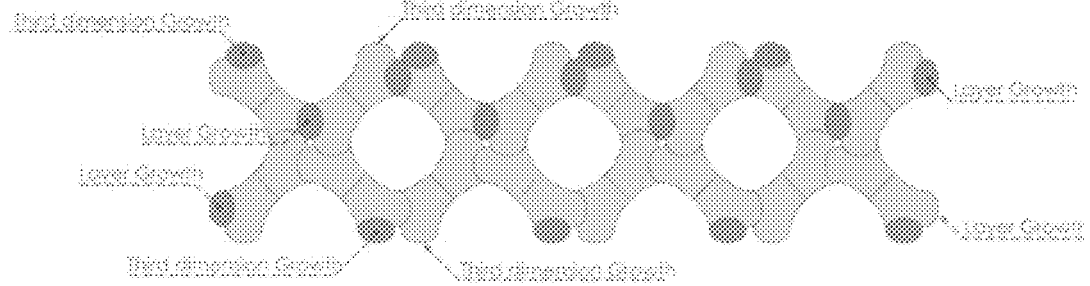
Figure 12E:
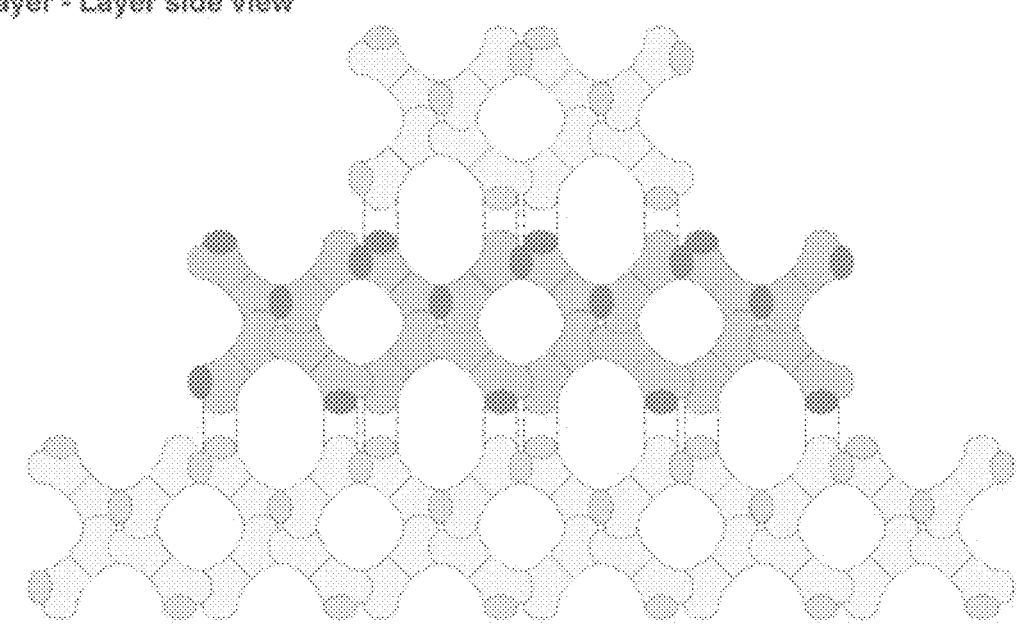
Figure 12F:
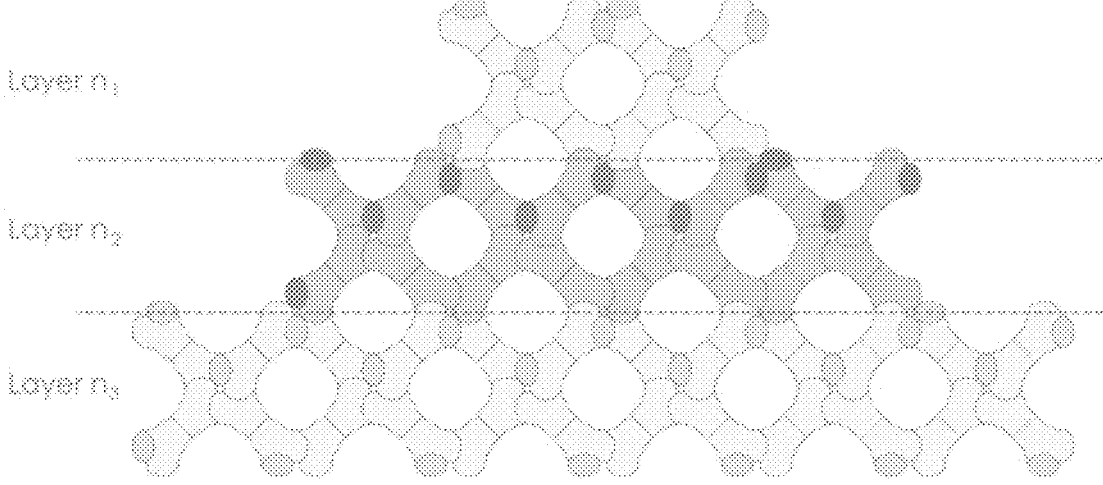

FIGS. 12D-12F illustrates examples of layer assembly and growth. Layer assembly and growth may occur in any direction. The connected points of one minimodule to another minimodule is referred to as a "mouth". This first assembly of interconnected minimodules which are oriented identically is referred to as a "layer". FIG. 12D shows an example layer of a three-dimensional matrix. The minimodule can comprise a plurality of mouths to connect to another microchannel in the same layer, e.g., for a growth in a same layer. The minimodule can comprise a plurality of mouths to connect to another microchannel in a different layer, e.g., for a growth in a different layer. FIGS. 12E and 12F show example assemblies comprising multiple three-dimensional layers (e.g., layer $n_1$, $n_2$, and $n_3$). The layer can be arranged, for example, in a rhomboid shape such that in some embodiments, if the same number of modules are connected in the selected directions, the resultant growth is not proportional and as such the growth of the layers is irregular with respect to one another. In some embodiments, the layer is arranged in a square shape or such that the resultant growth is proportional.

The minimodules may be the building blocks of a larger structure which may be a SG or DG module. Minimodules may be constructed by the assembly of a plurality of smaller units such as unit cells which may be voxels that can be used to define a space or a structure in the space. A unit cell may comprise a shape. The shape of a minimodule may comprise any shape, such as any geometric shape and any size. A minimodule may be a crystallographic cell which may be used to order or define a space. For example, a space or a characteristic thereof may be defined, constructed, or shaped due to the presence or absence of a unit cell or a position thereof in the space. For example, in a given area of the space, a high density of an example unit cell or voxel may be provided to define or make a solid object. For example, a large numbers of a unit cells or voxels may be located within a small area, therefore, the area may be dense of unit cells or voxels and may be defined as or perceived by a user, an entity, a software, a machine, or an artificial intelligence (AI) as a solid structure such as a wall with a given thickness. In another example, the unit cells may be sparse in a given area. In such case, the unit cells or voxels may be assembled to make a hollow space, a substantially void space, a channel, a hole, or alike. For example, a number of unit cells of a suitable shape may be assembled to make a minimodule or building block such as a conduit, or a hollow chamber, such as a hollow chamber of a SG or DG module.

A minimodule may be constructed by an assembly of a plurality of smaller units such as voxels or unit cells. In some examples, a minimodule may be comprised of crystallographic cells that can be used to define and/or order a space such as a 3D space according to the methods of the present disclosure. The shape of a unit cell may belong to a given class. Examples of a class of a unit cell or crystallographic cell may comprise primitive, body centered, face centered, side centered, other classes, and combinations thereof. Examples of the shape of the unit cell may comprise a cubical shape, a spherical shape, a rectangular shape, a pyramidal shape, a gyroid shape, a single gyroid shape, a double gyroid shape, a triclinic shape, a monoclinic shape, an orthorhombic shape, a trigonal shape, a hexagonal, or any other geometric shape. The shape of a unit cell may comprise a Bravais lattice. The Bravais lattice may comprise a shape provided herein. The unit cell may be used as a voxel to order or generate a space and to make a minimodule.

A crystallographic cell or unit cell may comprise one or more elements, in some examples, a finite number of elements. An element may be a set of coordinates that may be given a meaning. Examples of an element may comprise a point, an axis, a proper axis, an improper axis, a center, a plane, or another element. In some examples, the assembly of unit cells and elements may form a structure, such as a macrostructure or a minimodule. In an example, such assemblies may form a hollow cylinder which may be configured to allow a flow of a fluid. For example, an assembly of unit cells, elements, and/or combinations thereof may make a channel, a conduit, a chamber, or another minimodule or building block of a purification device described herein, such as a channel. In some embodiments, the assembly of unit cells and elements may form a solid structure, such as a solid wall, a solid block, or another structure.

Figures 13A, 13B:
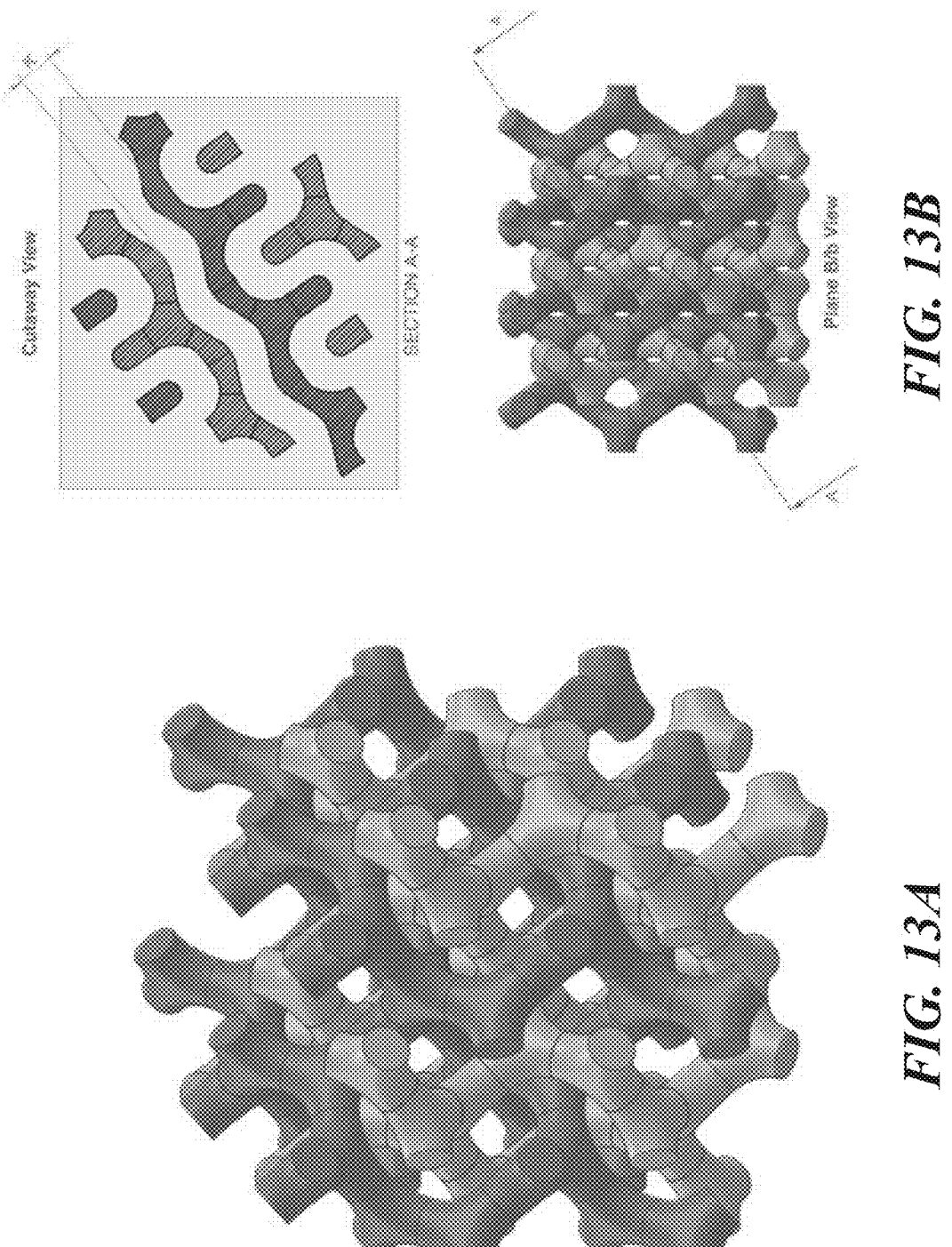
FIGS. 13A-13F show example assembly of two matrices formed by double gyroids (FIGS. 13A, 13B, 13E, and 13F) or single gyroids (FIGS. 13C and 13D)
Figures 13C, 13D, 13E, 13F:
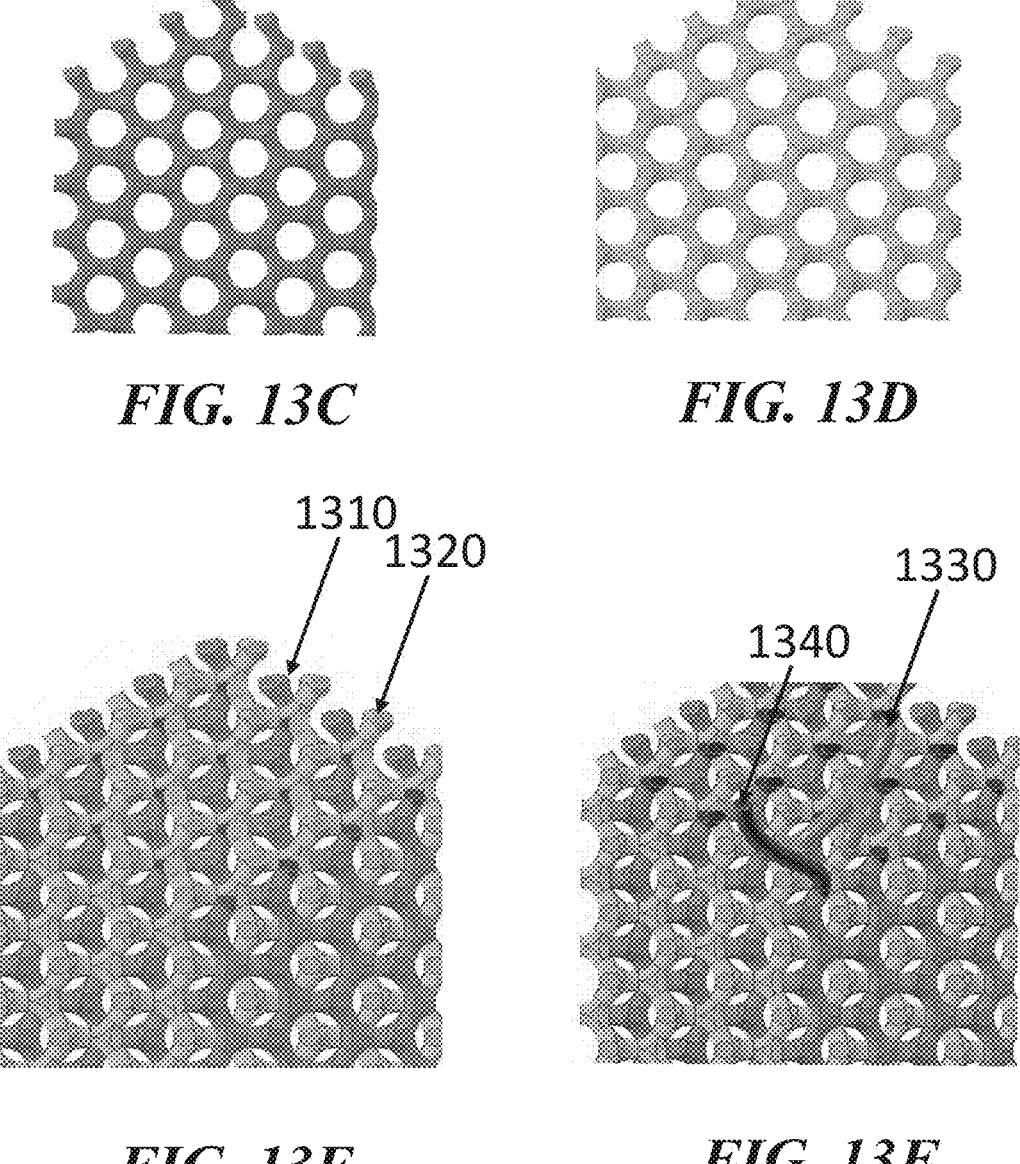

In some embodiments, an assembly of layers of the minimodules ("first matrix") can be co-located with a second assembly of layers of minimodules ("second matrix") whereby the second matrix may occupy the free spaces left by the first matrix and whereby the matrices occupying the same volume may have no point of contact and may maintain a constant minimum distance. An example assembly of two matrices is shown in FIGS. 13A and 13B. FIG. 13A shows an example of a portion of a double gyroid inscribed in a cube. FIG. 13B shows an orthogonal and cut away view of the structure of FIG. 13A. FIG. 13C shows a first gyroid matrix. FIG. 13D shows a second gyroid matrix. FIG. 13E shows two matrices (lighter gray shows one gyroid matrix 1310 and darker gray shows another gyroid matrix 1320) assembled to form a double gyroid. FIG. 13E shows the double gyroids with exemplary feeding ports 1330 and 1340.

Computer Systems

Figure 11:
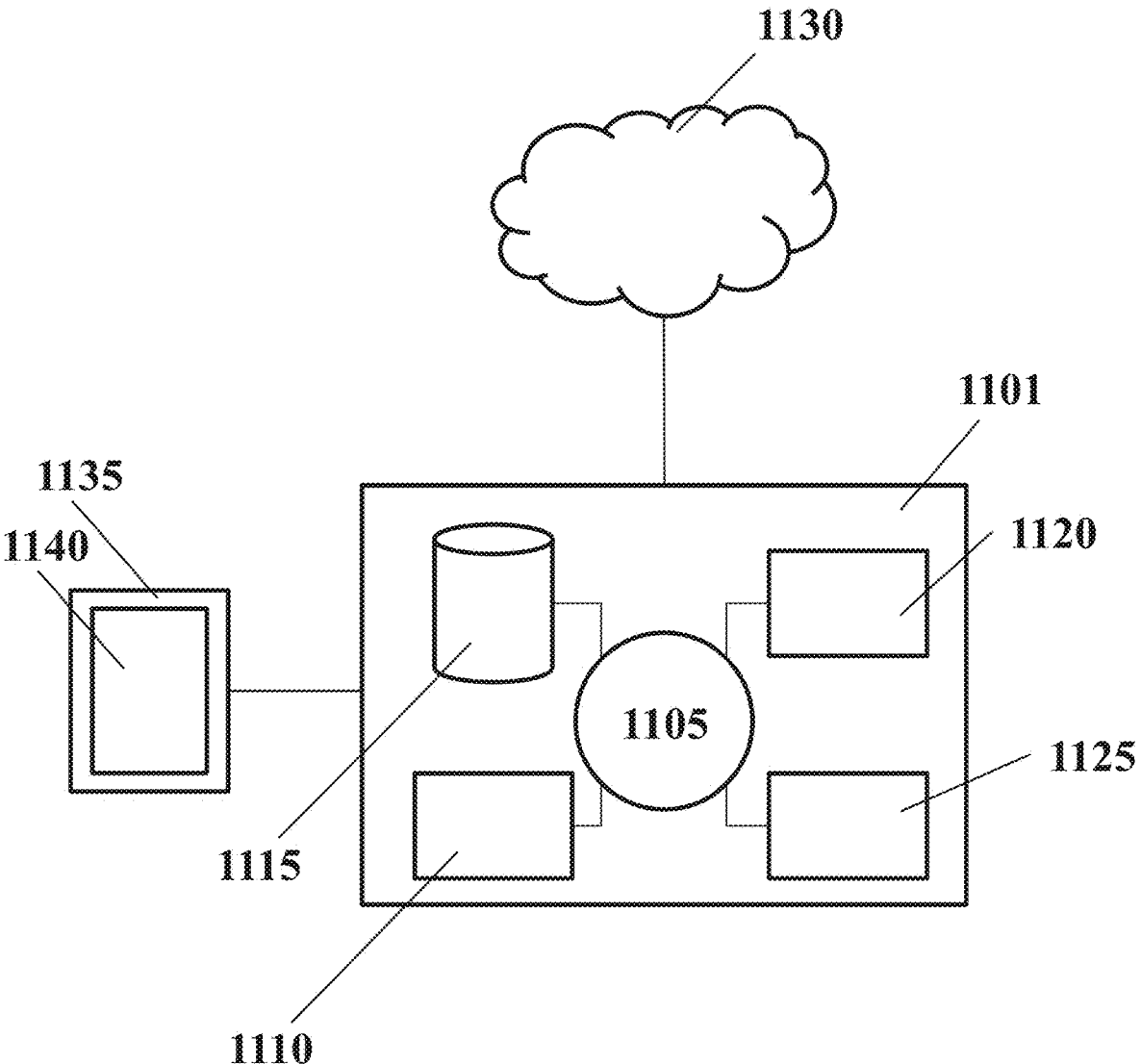
FIG. 11 shows a computer system 1101.

The present disclosure provides computer systems that are programmed to implement methods of the disclosure. FIG. 11 shows a computer system 1101 that is programmed or otherwise configured to control all the internal processes of the systems as programmed, such as data acquisition through embedded sensors (e.g., physical, chemical, and biological data), sensor data fusion and commanding control loops, image processing, and creating data sets associated with each process. The computer system 1101 can regulate various aspects of the purification process. The computer system 1101 can be an electronic device of a user or a computer system that is remotely located with respect to the electronic device. The electronic device can be a mobile electronic device.

The computer system 1101 includes a central processing unit (CPU, also "processor" and "computer processor" herein) 1105, which can be a single core or multi core processor, or a plurality of processors for parallel processing. The computer system 1101 also includes memory or memory location 1110 (e.g., random-access memory, read-only memory, flash memory), electronic storage unit 1115 (e.g., hard disk), communication interface 1120 (e.g., network adapter) for communicating with one or more other systems, and peripheral devices 1125, such as cache, other memory, data storage and/or electronic display adapters. The memory 1110, storage unit 1115, interface 1120 and peripheral devices 1125 are in communication with the CPU 1105 through a communication bus (solid lines), such as a motherboard. The storage unit 1115 can be a data storage unit (or data repository) for storing data. The computer system 1101 can be operatively coupled to a computer network ("network") 1130 with the aid of the communication interface 1120. The network 1130 can be the Internet, an internet and/or extranet, or an intranet and/or extranet that is in communication with the Internet. The network 1130 in some cases is a telecommunication and/or data network. The network 1130 can include one or more computer servers, which can enable distributed computing, such as cloud computing. The network 1130, in some cases with the aid of the computer system 1101, can implement a peer-to-peer network, which may enable devices coupled to the computer system 1101 to behave as a client or a server.

The CPU 1105 can execute a sequence of machine-readable instructions, which can be embodied in a program or software. The instructions may be stored in a memory location, such as the memory 1110. The instructions can be directed to the CPU 1105, which can subsequently program or otherwise configure the CPU 1105 to implement methods of the present disclosure. Examples of operations performed by the CPU 1105 can include fetch, decode, execute, and writeback.

The CPU 1105 can be part of a circuit, such as an integrated circuit. One or more other components of the system 1101 can be included in the circuit. In some cases, the circuit is an application specific integrated circuit (ASIC).

The storage unit 1115 can store files, such as drivers, libraries and saved programs. The storage unit 1115 can store user data, e.g., user preferences and user programs. The computer system 1101 in some cases can include one or more additional data storage units that are external to the computer system 1101, such as located on a remote server that is in communication with the computer system 1101 through an intranet or the Internet.

The computer system 1101 can communicate with one or more remote computer systems through the network 1130. For instance, the computer system 1101 can communicate with a remote computer system of a user (e.g., Virtual Private Networks, Computer hosted in services such as Amazon Web Services (AWS), Satellite communication). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1101 via the network 1130.

Methods as described herein can be implemented by way of machine (e.g., computer processor) executable code stored on an electronic storage location of the computer system 1101, such as, for example, on the memory 1110 or electronic storage unit 1115. The machine executable or machine readable code can be provided in the form of software. During use, the code can be executed by the processor 1105. In some cases, the code can be retrieved from the storage unit 1115 and stored on the memory 1110 for ready access by the processor 1105. In some situations, the electronic storage unit 1115 can be precluded, and machine-executable instructions are stored on memory 1110.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1101, can be embodied in programming. Various aspects of the technology may be thought of as "products" or "articles of manufacture" in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1101 can include or be in communication with an electronic display 1135 that comprises a user interface (UI) 1140 for providing, for example, settings, bioprocess report listing measured variables in real time of every stage of the system, capabilities to export and import files (e.g., configuration files, updates), calibration, alarms (e.g., errors, maintenance, replacement of consumables). Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1105. The algorithm can, for example, adjust variables of the control systems using feedback loops, detect problems in the process by image recognition and pattern analysis, fuzzy logic and with hard and soft threshold enforcements, correlate specific and unspecific data through machine learning (e.g., Supervised, Unsupervised and/or Reinforcement) to optimize process conditions within the system, the process outcomes, modelling behavior and simulation.

EXAMPLES

The following examples are provided to further illustrate some embodiments of the present disclosure, but are not intended to limit the scope of the disclosure, it will be understood by their exemplary nature that other procedures, methodologies, or techniques known to those skilled in the art may alternatively be used.

Example 1: Continuous Purification Device Design

Different feed ports architectures were tested for mixing efficiency. For architectures A and B (FIG. 14), 2 syringe pumps were connected to an Y connector (1410 and 1420) and then to the bottom of the single gyroids with one entrance. The device was placed vertically to release any trapped bubble. Equal flow rates were used in architecture A ($q_1=q_2$) and different flow rates were used in architecture B ($q_1=4*q_2$). For architectures C and D (FIG. 14), each syringe pump was connected to each entrance. Each of the two entrances is subdivided to a plurality of sub-ports that each sub-port of the plurality of sub-ports was in fluidic communication with a channel of the first layer of the gyroids. Each channel of the first layer of the gyroids received a portion of the first liquid and a portion of the second liquid. Equal flow rates were used in architecture C ($q_1=q_2$) and different flow rates were used in architecture D ($q_1=4*q_2$).

FIG. 14 shows the mixing efficiency of architectures A-D. Architecture D had the best mixing of the two liquid streams.

Figure 15:
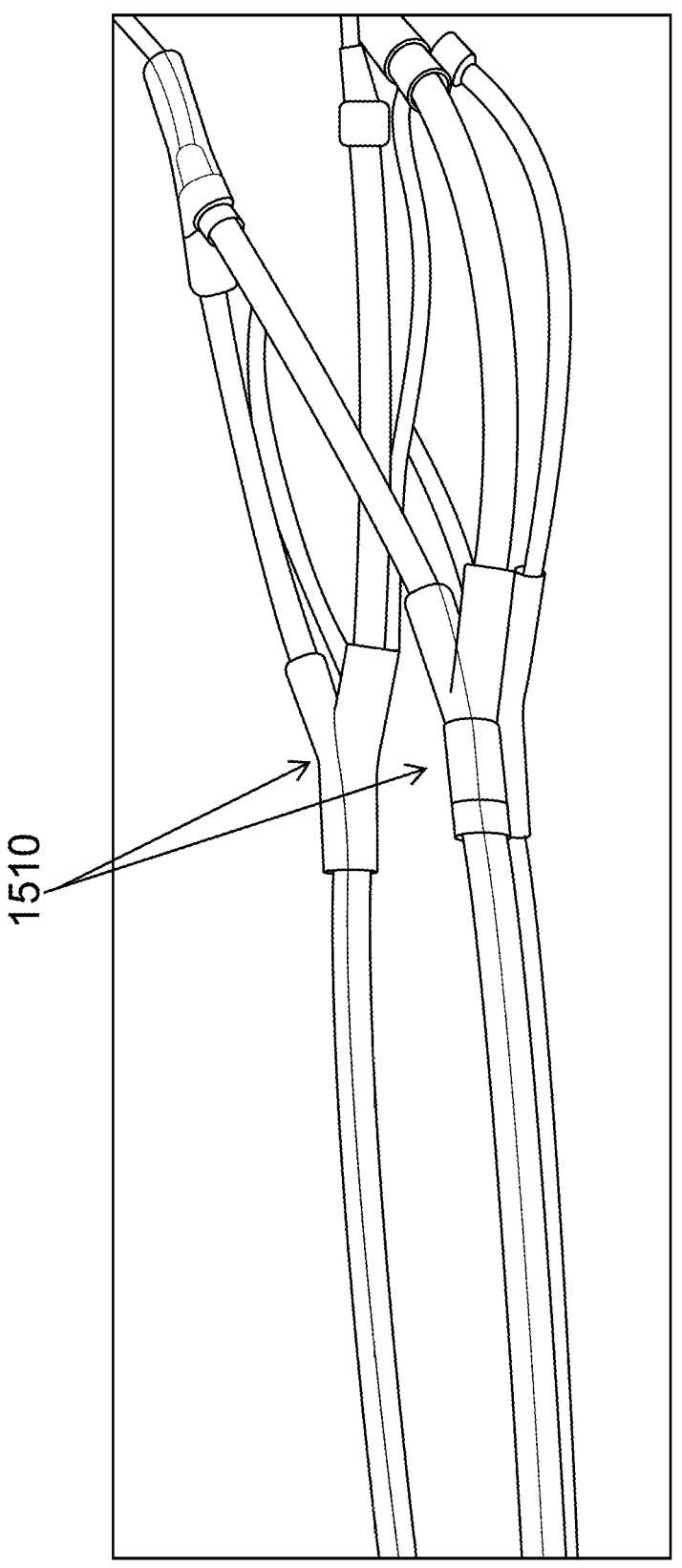
FIG. 15 shows the two colored solution streams did not mix.

To further demonstrate the mixing efficiency achieved by the use of the 2-port input system with asymmetric flow, the following simulations and experiments were performed. A single hose with laminar flow was connected at its entrance to a Y connector (1510) and colored solution was applied using 2 syringe pumps (blue into one side of the Y connector and red into the other side of the Y connector). As shown in FIG. 15, the two colored solutions did not mix (one stream with a darker color and the other stream with a lighter color in grayscale).

Figure 16:
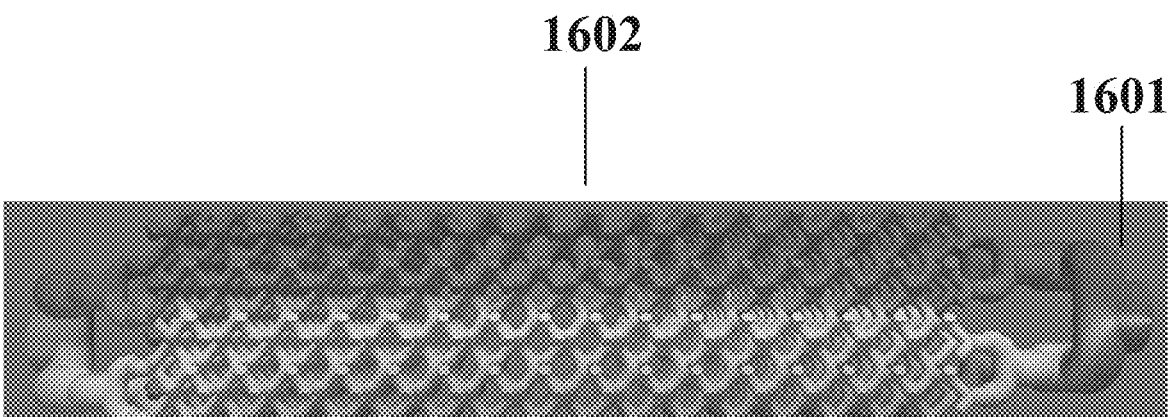
FIG. 16 shows the mixing efficiency of a gyroid structure with a single input port feeding each of the gyroid structures in the first layer.
Figures 18A, 18B:
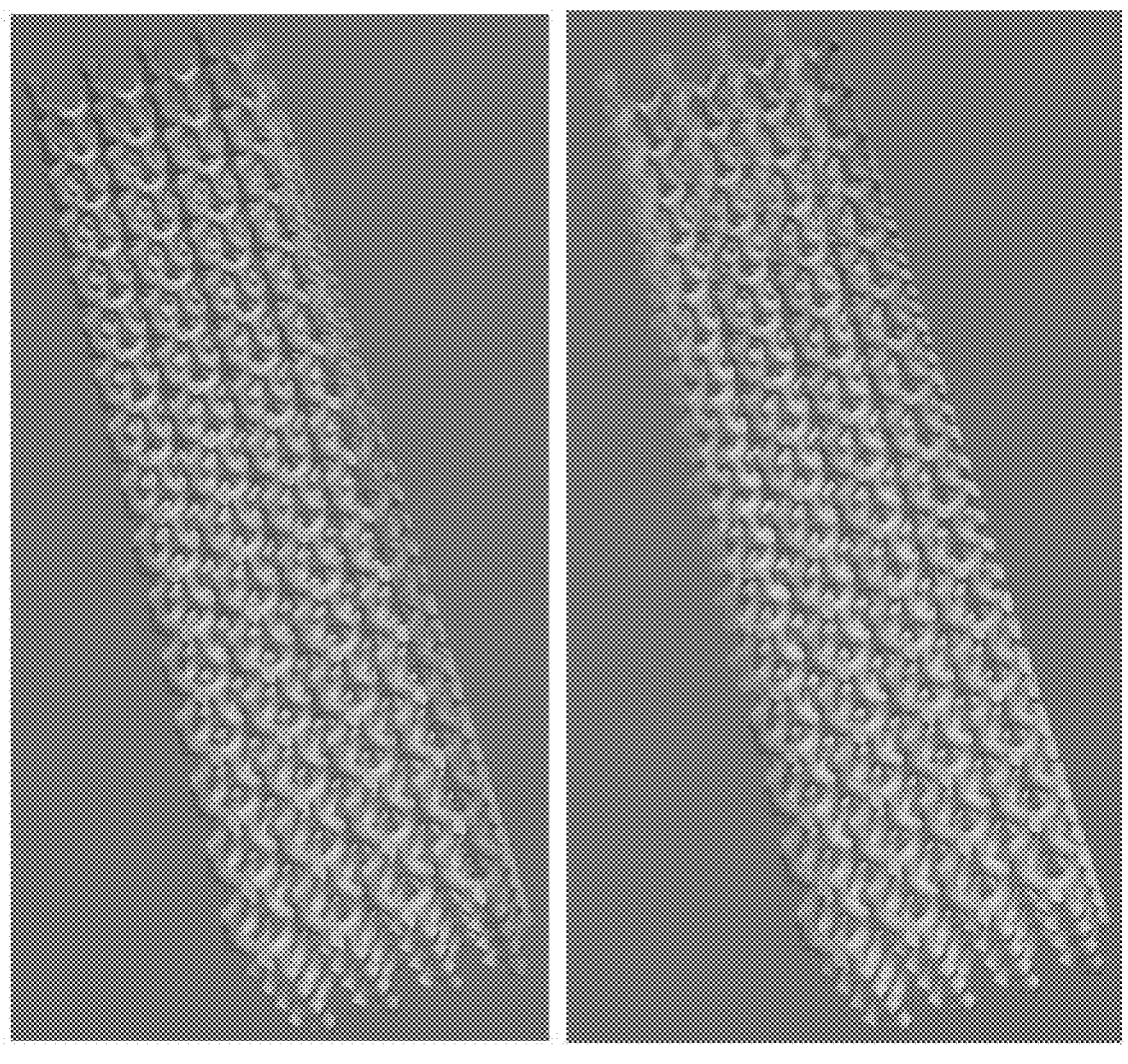
FIGS. 18A and 18B show the mixing efficiency with a feeding tree to feed each gyroid from two ports with symmetrical flow.

A series of simulations were carried out with single gyroid structures to examine the effects of single and multiple input ports and symmetric and asymmetric flow. FIG. 16 shows the mixing efficiency of a gyroid structure 1602 with a single input port 1601 feeding each of the gyroid structures in the first layer. This design does not allow mixing at operation flow rates of the purification device. FIGS. 17A and 17B show the mixing efficiency after the modification of the feeding tree to feed each gyroid from two ports with asymmetrical flow. FIGS. 18A and 18B show the mixing efficiency after the modification of the feeding tree to feed each gyroid from two ports with symmetrical (equal) flow. The feeding of each gyroid from two ports improved mixing, with asymmetrical flow between the 2 ports showing better mixing as compared to symmetrical (equal) flow. With a single gyroid structure, each gyroid is fed from both ports; in a double gyroid structure, the feeding tree dichotomously bifurcates one more time in order to guarantee that both ports feed each gyroid of each matrix. In FIGS. 17A and 18A, the solution comprises nanoparticles. In FIGS. 17B and 18B, the solution comprises the culture media. The asymmetrical flow reduces the diffusion distance and allows a significantly better mixing in comparison to the symmetrical flow.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the present disclosure may be employed in practicing the present disclosure. It is intended that the following claims define the scope of the present disclosure and that methods and structures within the scope of these claims and their equivalents be covered thereby.

What is claimed is:

1. A method of purification of a substance of interest, comprising:

directing a first liquid comprising the substance of interest into a mixing module of an apparatus, directing a second liquid comprising a plurality of particles into the mixing module of the apparatus, and flowing the first liquid and the second liquid through the apparatus, wherein the apparatus comprises:

i) the mixing module comprising:

a first network comprising a first plurality of gyroids configured in layers to provide a first plurality of microchannels, wherein the first plurality of microchannels are fluidically interconnected;

ii) a first port configured to receive the first liquid, wherein the first port comprises a first plurality of sub-ports, each sub-port is in fluid communication with an inlet of a microchannel of a first layer of the first plurality of gyroids;

iii) a second port configured to receive the second liquid, wherein the second port comprises a second plurality of sub-ports, each sub-port is in fluid communication with an inlet of a microchannel of the first layer of the first plurality of gyroids;

iv) a wash module downstream of the mixing module comprising:

a second network comprising a second plurality of gyroids in fluid communication with the mixing module and configured to provide a second plurality of microchannels, wherein the second plurality of microchannels are fluidically interconnected;

v) a third port configured to receive a third liquid, wherein the third port is upstream of the wash module;

vi) a first separation module downstream of the wash module comprising:

at least one channel in fluid communication with the wash module;

a fourth port configured to receive a fourth liquid comprising an elution solution;

a first transport component configured to interact with the plurality of particles, thereby directing the plurality of particles to the fourth liquid in the at least one channel; and a first outlet and a second outlet each in fluid communication with the at least one channel of the first separation module, wherein the first outlet is configured to receive the fourth liquid and the plurality of particles exiting the wash module and the second outlet is configured to receive remaining liquid;

vii) an elution module downstream of the first separation module comprising:

a third network comprising a third plurality of gyroids configured to provide a third plurality of microchannels, wherein the third plurality of microchannels are fluidically interconnected and in fluid communication with the first outlet; and viii) a second separation module downstream of the elution module comprising:

at least one channel in fluid communication with the elution module;

a fifth port configured to receive a fifth liquid comprising a re-equilibration solution;

a third outlet and a fourth outlet each in fluid communication with the at least one channel of the second separation module, wherein the fourth outlet is configured to receive the re-equilibration solution and the plurality of particles exiting the elution module and the third outlet is configured to receive remaining liquid; and a second transport component configured to interact with the plurality of particles, thereby directing the plurality of particles to the re-equilibration solution.

2. The method of claim 1, wherein the first liquid comprises a medium from a reactor, processor, bio-reactor, or bio-processor.

3. The method of claim 1, wherein the substance of interest is a protein.

4. The method of claim 1, wherein the plurality of particles comprises one or more nanoparticles.

5. The method of claim 4, wherein the one or more nanoparticles comprise magnetic nanoparticles.

6. The method of claim 5, wherein the one or more nanoparticles are coated with a binding agent.

7. The method of claim 6, wherein the binding agent is capable of interacting with the substance of interest.

8. The method of claim 7, wherein the binding agent is an antigen binding fragment.

9. The method of claim 8, wherein the binding agent is protein A, protein G, protein M, protein L, a recombinant fusion protein thereof, a variant thereof, or a combination thereof.

10. The method of claim 1, wherein a flow rate ratio of the first liquid and the second liquid is from 1:2 to 1:8.

11. The method of claim 1, further comprising directing a wash solution to the apparatus.

12. The method of claim 1, further comprising directing the elution solution to the first separation module.

13. The method of claim 1, further comprising directing the re-equilibrium solution to the second separation module.

14. The method of claim 1, wherein at least one gyroid of the first plurality of gyroids, the second plurality of gyroids, and/or the third plurality of gyroids, is a double gyroid or a modified double gyroid.

* * * * *